(12) United States Patent
Fukui

(10) Patent No.: US 12,506,723 B2
(45) Date of Patent: Dec. 23, 2025

(54) VEHICLE CONTROL SYSTEM AND COMMUNICATION PROCESSING METHOD

(71) Applicant: HONDA MOTOR CO., LTD., Tokyo (JP)

(72) Inventor: Kazuki Fukui, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 18/582,285

(22) Filed: Feb. 20, 2024

(65) Prior Publication Data

US 2024/0333698 A1    Oct. 3, 2024

(30) Foreign Application Priority Data

Mar. 31, 2023   (JP) ................................. 2023-057225

(51) Int. Cl.
*H04L 9/40*      (2022.01)
*B60R 16/023*    (2006.01)
*H04L 67/12*     (2022.01)

(52) U.S. Cl.
CPC ............ *H04L 63/08* (2013.01); *B60R 16/023* (2013.01); *H04L 67/12* (2013.01)

(58) Field of Classification Search
CPC . H04L 63/08; H04L 67/12; H04L 9/40; H04L 63/1416; H04L 63/1441;
(Continued)

(56) References Cited

U.S. PATENT DOCUMENTS

2021/0250340 A1*  8/2021  Green ............... H04L 12/40013
2021/0314336 A1  10/2021  Kishikawa et al.
(Continued)

FOREIGN PATENT DOCUMENTS

EP     4366246 A1 *  5/2024  ......... G06F 9/45558
WO  2021/002010 A1    1/2021
(Continued)

OTHER PUBLICATIONS

Japanese Office Action Corresponding to JP Application No. JP 2023-057225, dated Sep. 24, 2024, with English Translation, 11 pages.

*Primary Examiner* — Javier O Guzman
(74) *Attorney, Agent, or Firm* — Rankin, Hill & Clark LLP

(57) ABSTRACT

A vehicle control system includes two control device groups respectively constituting two communication networks, a communication management device communicably connected to the two control device groups, and a routing device that routes communication between the two communication networks. When a message is received from one of control devices, the communication management device performs authentication processing for the control device and includes a communication address of one control device as a transmission source address in a relay message for relaying the message received from the one control device to a control device of the other of the control device groups, and the control device of the other of the control device groups performs communication with the one control device by using the communication address of the one control device included in the relay message without interposition of the communication management device.

7 Claims, 13 Drawing Sheets

(58) Field of Classification Search
CPC ..... H04L 67/01; H04L 69/26; H04L 2209/84; B60R 16/023
See application file for complete search history.

(56) References Cited

U.S. PATENT DOCUMENTS

| | | | | |
|---|---|---|---|---|
| 2022/0330025 | A1* | 10/2022 | Goto | H04W 4/48 |
| 2022/0413793 | A1* | 12/2022 | Fry | G06F 3/165 |
| 2023/0271628 | A1* | 8/2023 | Watts | G06V 10/87 |
| | | | | 701/28 |
| 2023/0344654 | A1* | 10/2023 | Palukuru | H04L 9/3234 |
| 2024/0067216 | A1* | 2/2024 | Gokhale | B60W 50/0097 |
| 2024/0157893 | A1 | 5/2024 | Isoyama et al. | |
| 2024/0308443 | A1* | 9/2024 | Kim | H04L 12/40013 |
| 2024/0333802 | A1* | 10/2024 | Mesde | H04L 69/08 |

FOREIGN PATENT DOCUMENTS

| | | |
|---|---|---|
| WO | 2021/020025 A1 | 2/2021 |
| WO | 2022/190580 A1 | 9/2022 |

\* cited by examiner

NETWORK CONFIGURATION
(RELATED ART)

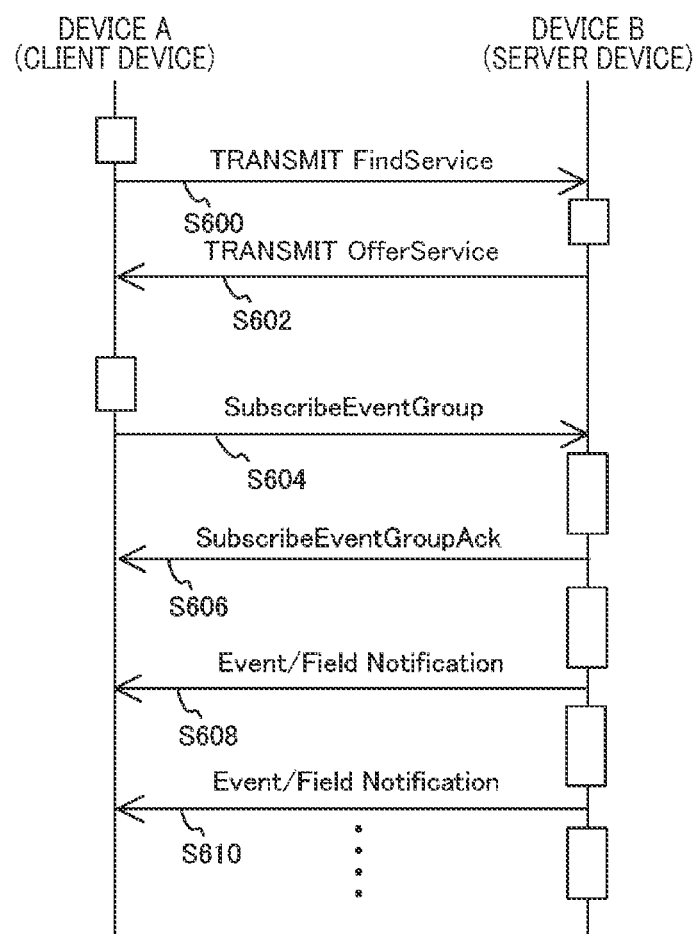

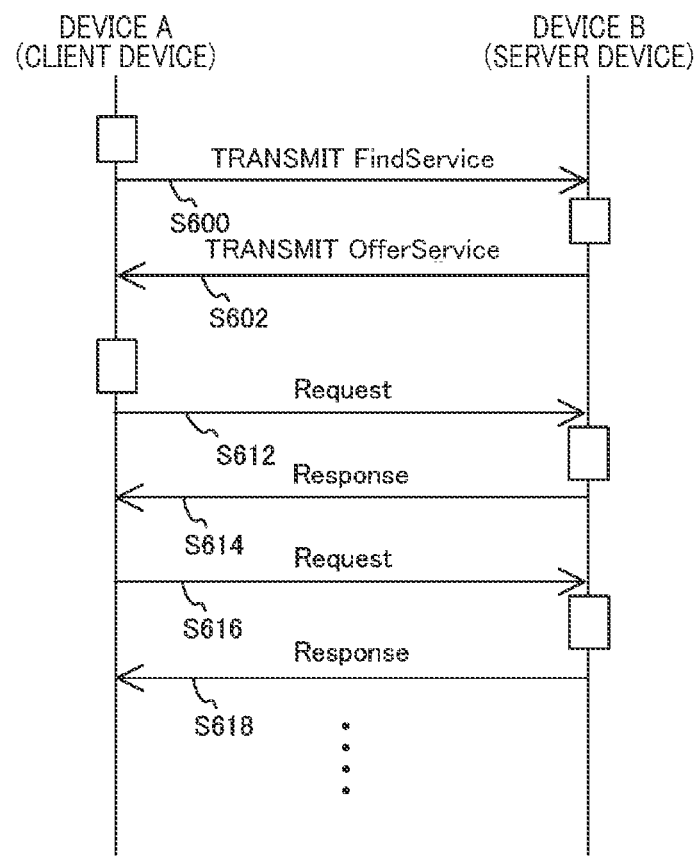

FIG.13

SOME/IP PACKET CONFIGURATION EXAMPLE
(RELATED ART)

| | byte | 1 | | | | 2 | | | | 3 | | | | 4 | | | |
|---|---|---|---|---|---|---|---|---|---|---|---|---|---|---|---|---|---|
| | bit | 0 1 2 3 | 4 5 6 7 | 8 9 10 11 12 13 14 15 | | 16 17 18 19 20 21 22 23 | | 24 25 26 27 28 29 30 31 | | | | | | | | | |
| IP HEADER | Version | | IHL | | Type of Service | | | Total Length | | | | | | | | |
| | | 4 | | 5 | | 0 | | 0 | | 0 | | 0 | | b | | 0 |
| | Identification | | | | | | | Flags | | Fragment Offset | | | | | | |
| | | 0 | | 0 | | 0 | | 0 | | 0 | | 0 | | b | | 0 |
| | TTL | | | | Protocol | | | Header Checksum | | | | | | | | |
| | | 4 | | 5 | | 1 | | 7 | | 0 | | 0 | | 0 | | 0 |
| | Source Address | | | | | | | | | | | | | | | |
| | | C | | 0 | | A | | 8 | | 0 | | 0 | | 1 | | 0 |
| | Destination Address | | | | | | | | | | | | | | | |
| | | C | | 0 | | A | | 8 | | 0 | | 0 | | 0 | | 1 |
| | Options | | | | | | | | | Padding | | | | | | |
| | | C | | 0 | | A | | 8 | | 0 | | 0 | | 0 | | 1 |
| UDP HEADER | Source Port | | | | | | | Destination Port | | | | | | | | |
| | | 4 | | E | | 2 | | 0 | | C | | 3 | | 5 | | 1 |
| | Total Length | | | | | | | Checksum | | | | | | | | |
| | | 0 | | 0 | | b | | 0 | | 0 | | 0 | | 0 | | 0 |
| SOME/IP HEADER | Service ID | | | | | | | Method ID | | | | | | | | |
| | | F | | F | | F | | F | | 8 | | 1 | | 0 | | 0 |
| | Length | | | | | | | | | | | | | | | |
| | | 0 | | 0 | | 0 | | 0 | | 0 | | 0 | | 5 | | 8 |
| | ClientID | | | | | | | SessionID | | | | | | | | |
| | | 0 | | 0 | | 0 | | 0 | | 0 | | 0 | | 0 | | 1 |
| | Protocol Version | | | | Interface Version | | | Message Type | | | | Return Code | | | | |
| | | 0 | | 1 | | 0 | | 1 | | 0 | | 2 | | 0 | | 0 |
| SOME/IP SD HEADER | Flags | | | | Reserved | | | | | | | | | | | |
| | | 0 | | 0 | | 0 | | 0 | | 0 | | 0 | | 0 | | 0 |
| | Length of Entries Array | | | | | | | | | | | | | | | |
| | | 0 | | 0 | | 0 | | 0 | | 0 | | 0 | | 1 | | 0 |
| Entries Array | Type | | | | Index 1st options | | | Index 2nd options | | | | # of opt1 | | # of opt2 | | |
| | | 0 | | 0 | | 0 | | 0 | | 0 | | 0 | | 0 | | 0 |
| | Service ID | | | | | | | Instance ID | | | | | | | | |
| | | 4 | | 7 | | 1 | | 1 | | C | | 3 | | 5 | | 1 |
| | Major Version | | | | TTL | | | | | | | | | | | |
| | | F | | F | | 0 | | 0 | | 0 | | E | | 1 | | 0 |
| | Minor Version | | | | | | | | | | | | | | | |
| | | F | | F | | F | | F | | F | | F | | F | | F |
| | Length of Options Array | | | | | | | | | | | | | | | |
| | | 0 | | 0 | | 0 | | 0 | | 0 | | 0 | | 1 | | 8 |
| Options Array | Length | | | | | | | Type | | | | Reserved | | | | |
| | | 0 | | 0 | | 0 | | 0 | | 0 | | 4 | | 0 | | 0 |
| | IPv4-Address | | | | | | | | | | | | | | | |
| | | C | | 0 | | A | | 8 | | 0 | | 0 | | 0 | | 1 |
| | Reserved | | | | L4-Proto | | | Port Number | | | | | | | | |
| | | 0 | | 0 | | 1 | | 1 | | C | | 3 | | 5 | | 1 |

VEHICLE CONTROL SYSTEM AND COMMUNICATION PROCESSING METHOD

INCORPORATION BY REFERENCE

The present application claims priority under 35 U.S.C. § 119 to Japanese Patent Application No. 2023-057225 filed on Mar. 31, 2023. The content of the application is incorporated herein by reference in its entirety.

BACKGROUND OF THE INVENTION

Field of the Invention

The present invention relates to a vehicle control system and a communication processing method to be executed by the vehicle control system.

Description of the Related Art

In recent years, research and development for improving safety of control in a vehicle have been performed.

International Publication No. WO2021/002010 discloses an illegal frame detection device that detects illegal frame transmission in an onboard network system adopting service-oriented communication and prevents establishment of illegal communication. In this device, illegal frame transmission is detected on the basis of relation between a server and a port to which a client is physically connected.

A problem in a technique related to safety of vehicle control is to achieve both high protectiveness against attacks on vehicle control and high responsiveness of vehicle control.

To solve the above-described problem, an object of the present application is to maintain high responsiveness of vehicle control while instantaneously detecting illegal communication from attackers on a vehicle control system and protecting the vehicle control system, and eventually, contribute to development of a sustainable transportation system by further improving traffic safety.

SUMMARY OF THE INVENTION

One aspect of the present invention is a vehicle control system including two control device groups respectively constituting two different communication networks mounted on a vehicle, a communication management device communicably connected to each of control devices of the two control device groups, and a routing device that routes communication between the two communication networks, wherein when a message is received from one of the control devices, the communication management device performs authentication processing for the one of the control devices, and when validity of the one of the control devices can be authenticated, transmits a relay message for relaying a message received from one control device that is a control device of one of the control device groups to a control device of the other of the control device groups, the relay message including a communication address of the one control device as a transmission source address, and wherein the control device of the other of the control device groups performs communication with the one control device via the routing device by using the communication address of the one control device included in the relay message without interposition of the communication management device.

According to another aspect of the present invention, when validity of the one of the control devices can be authenticated, the communication management device determines a communication address of the other control device with which the one control device should perform communication on the basis of device information of the respective control devices of the two control device groups, the other control device being the control device of the other of the control device groups, and the one control device being the control device of one of the control device groups that has transmitted the message and transmits a return message including the determined communication address of the other control device as a transmission source address to the one control device, and the one control device starts communication with the other control device via the routing device by using the communication address of the other control device included in the return message without interposition of the communication management device.

According to still another aspect of the present invention, one of the two control device groups includes a control device that performs control regarding motion control of the vehicle and does not include a control device that performs communication with outside of the vehicle, and the other of the two control device groups includes a control device that performs communication with outside of the vehicle and does not include a control device that performs control regarding motion control of the vehicle.

According to yet another aspect of the present invention, the communication management device includes two processing devices that perform processing independently from each other, and the two processing devices are respectively connected to different communication networks between the two communication networks.

According to another aspect of the present invention, the two processing devices are respectively physical machine and virtual machine to be implemented in a processor provided in the communication management device.

According to still another aspect of the present invention, communication to be performed by the control devices of the two control device groups and the communication management device is Service Oriented Middle warE over IP (SOME/IP) communication including transmission of a search notification and/or transmission of a provision notification, the search notification being a notification indicating that one of services, which are predetermined functional units, is searched for, the provision notification being a notification indicating that the service that is searched for can be provided.

According to yet another aspect of the present invention is a communication processing method to be executed by a vehicle control system including two control device groups respectively constituting two different communication networks mounted on a vehicle, a communication management device communicably connected to each of the control devices of the two control device groups, and a routing device that routes communication between the two communication networks, the communication processing method including an authentication processing step of, when a message is received from one of the control devices, the communication management device performing authentication processing for the one of the control devices, a relay transmission step of, when validity of the one of the control devices can be authenticated, the communication management device transmitting a relay message for relaying a message received from one control device that is a control device of one of the control device groups to a control device of the other of the control device groups, the relay message including a communication address of the one control device as a transmission source address, and a first direct communication step of the control device of the other of the control device groups performing communication with the one control device via the routing device by using the communication address of the one control device included in the relay message without interposition of the communication management device.

According to another aspect of the present invention, the communication processing method further includes a determination step of, when validity of the one of the control devices can be authenticated, the communication management device determining a communication address of the other control device with which the one control device should perform communication on the basis of device information of the respective control devices of the two control device groups, the other control device being the control device of the other of the control device groups, and the one control device being the control device of the one of the control device groups that has transmitted the message, a return transmission step of the communication management device transmitting a return message to the one control device, the return message including the determined communication address of the other control device as a transmission source address, and a second direct communication step of the one control device performing communication with the other control device via the routing device by using the communication address of the other control device included in the return message without interposition of the communication management device.

According to the aspect of the present invention, it is possible to maintain high responsiveness of vehicle control while instantaneously detecting illegal communication from attackers on a vehicle control system and protecting the vehicle control system.

BRIEF DESCRIPTION OF THE DRAWINGS

FIG. 11 is an explanatory diagram for explaining SOME/IP communication protocol;

FIG. 12 is an explanatory diagram for explaining SOME/IP communication protocol; and FIG. 13 is a view illustrating an example of a configuration of a communication packet to be used in SOME/IP communication.

DETAILED DESCRIPTION OF THE PREFERRED EMBODIMENT

An embodiment of the present invention will be described below with reference to the drawings.

1. Configuration of Vehicle Control System

Figure 1:
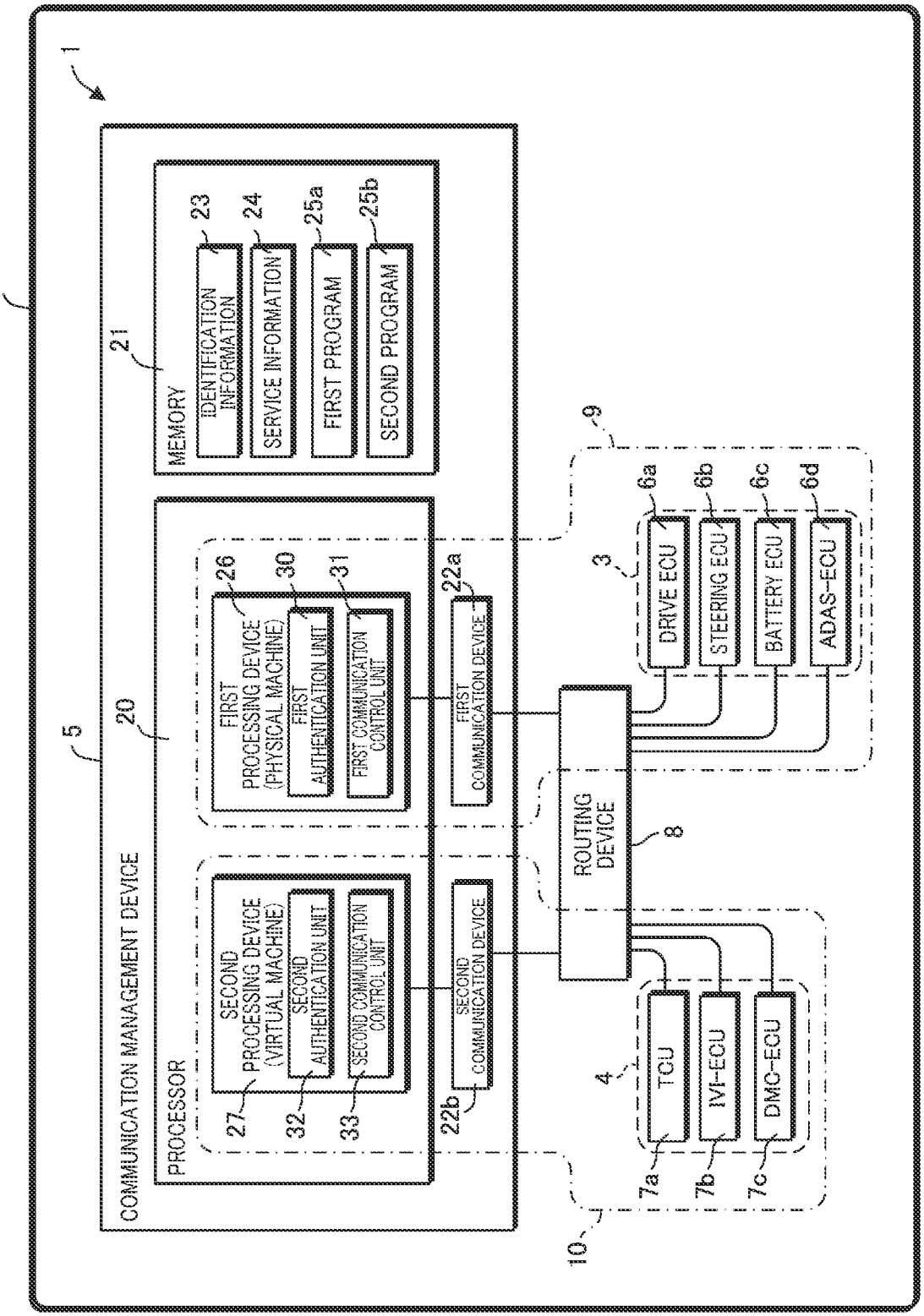
FIG. 1 is a view illustrating a configuration of a vehicle control system according to one embodiment of the present invention.

FIG. 1 is a view illustrating a configuration of a vehicle control system 1 according to one embodiment of the present invention. The vehicle control system 1 is mounted on a vehicle 2 and controls operation of the vehicle 2. The vehicle 2 can be an arbitrary vehicle to be driven by an internal combustion and/or a motor. In the present embodiment, the vehicle 2 is, for example, an electric vehicle to be driven by a drive motor to which power is fed from an in-vehicle battery (both are not illustrated).

The vehicle control system 1 includes a first control device group 3, a second control device group 4 and a communication management device 5. In the present embodiment, the first control device group 3 does not include a control device that performs communication with outside of the vehicle 2 and includes a control device that performs control regarding motion control of the vehicle 2. In the present embodiment, the first control device group 3 includes a drive electronic control unit (ECU) 6a, a steering ECU 6b, a battery ECU 6c, and an advanced driver-assistance system (ADAS)-ECU 6d as control devices that perform control regarding motion control of the vehicle 2.

The drive ECU 6a controls operation of the drive motor that drives the vehicle 2, and the steering ECU 6b controls operation of steering, deceleration, acceleration, and the like, of the vehicle 2 on the basis of manipulation regarding steering manipulation of a steering wheel, a brake, an accelerator, and the like, of the vehicle 2. The battery ECU 6c detects a remaining amount of charge of the in-vehicle battery and controls operation of power feeding to the drive motor. Further, the ADAS-ECU 6d controls driver assistance operation such as cruise operation, lane keeping operation, and the like, of the vehicle 2. Hereinafter, the drive ECU 6a, the steering ECU 6b, the battery ECU 6c, and the ADAS-ECU 6d included in the first control device group 3 will be collectively referred to as an ECU 6.

The second control device group 4 does not include a control device that performs control regarding motion control of the vehicle 2 and includes a control device that performs communication with outside of the vehicle 2. In the present embodiment, the second control device group 4 includes a telematics control unit (TCU) 7a and an in-vehicle infotainment (IVI)-ECU 7b as control devices that perform communication with outside of the vehicle 2. The TCU 7a is a wireless communication device (transmitter/receiver, circuit) for performing communication with devices outside the vehicle 2 directly or indirectly via an external communication network. The IVI-ECU 7b receives radio waves of radio broadcasting or TV broadcasting, and/or receives GPS radio waves, displays an image or a video to passengers of the vehicle 2 using an in-vehicle display device, speaker, and the like (both are not illustrated), and/or provides information of route guide, and the like.

Further, the second control device group 4 includes, for example, a driver monitoring camera (DMC)-ECU 7c that controls operation of a DMC which is provided inside a vehicle interior of the vehicle 2 and which is not illustrated. Hereinafter, the TCU 7a, the IVI-ECU 7b, and the DMC-ECU 7c included in the second control device group 4 will be collectively referred to as an ECU 7.

While the first control device group 3 and the second control device group 4 respectively include four or three control devices in the present embodiment, the first control device group 3 and the second control device group 4 only require to respectively include at least one control device.

Each of the ECU 6 and the ECU 7 includes a computer and performs predetermined control operation and communication with other in-vehicle devices.

The vehicle control system 1 further includes a routing device 8. The routing device 8 has a hub function of communicably connecting between the control devices, and a routing function of routing communication across a plurality of communication networks constituted by these control devices.

Each ECU 6 of the first control device group 3 and a first processing device 26 provided in a communication management device 5 which will be described later are connected to the routing device 8 to constitute a first communication network 9. Further, each ECU 7 of the second control device group 4 and a second processing device 27 provided in the communication management device 5 which will be described later are connected to the routing device 8 to constitute a second communication network 10.

In the communication management device 5, the first processing device 26 and the second processing device 27 cooperate to manage communication between the ECU 6 that is a control device of the first control device group 3 constituting the first communication network 9 and the ECU 7 that is a control device of the second control device group 4 constituting the second communication network 10.

In the present embodiment, the ECU 6, the ECU 7, the first processing device 26, and the second processing device 27 perform communication conforming to TCP/IP protocol in accordance with Ethernet® communication standards. Further, the first communication network 9 and the second communication network 10 are virtual local-area-networks (VLANs) different from each other. The routing device 8 is, for example, an L3 switch. The routing device 8 may be incorporated in the communication management device 5.

In the present embodiment, the ECU 6, the ECU 7, the first processing device 26, and the second processing device 27, for example, perform communication conforming to Service Oriented Middle warE over IP (SOME/IP) specified in AUTomotive Open System ARchitecture (AUTOSAR).

2. Explanation Regarding SOME/IP Communication

Here, outline of SOME/IP communication that is the related art will be described.

Figure 10:
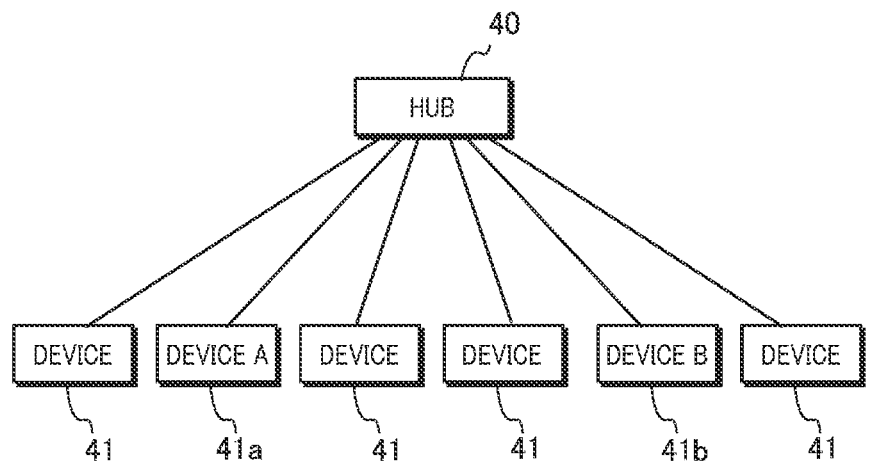
FIG. 10 is an explanatory diagram for explaining SOME/IP communication.

FIG. 10, FIG. 11, FIG. 12, and FIG. 13 are views for explaining the SOME/IP communication. The SOME/IP communication is used to, for example, achieve provision and reception of a service by establishing communication between one device 41 that requests provision of the service and another device 41 that can provide the service among a plurality of devices 41 that are connected to a hub 40 to constitute a communication network as illustrated in FIG. 10.

Here, the service refers to each of functions and processing obtained by segmentalizing various kinds of operation (such as, for example, acquisition and provision of sensor data from a sensor such as a camera, control of a motor and an actuator and provision of state information) to be achieved by each device 41 executing an application program. Further, a device that receives provision of the service (specifically, provision of data relating to the service) will be referred to as a client device, and a device that provides the service will be referred to as a server device. In FIG. 10, an arbitrary one device 41 among the plurality of devices 41 can become the client device, and the other one arbitrary device 41 can become the server device.

Each device 41 transmits various kinds of messages (SOME/IP messages) specified in SOME/IP on an IP packet specified by Ethernet.

Particularly, communication for searching for a device on a network that provides a service will be referred to as SOME/IP-SD (service discovery). SOME/IP-SD communication includes communication of a FindService message, an OfferService message, a SubscribeEventGroup message, an Event message, and a FieldNotification message which will be described later.

FIG. 13 is a view illustrating an example of a configuration of a head portion of a communication packet to be used in the SOME/IP-SD communication. In detail, FIG. 13 illustrates the head portion of the communication packet to be continuous with a MAC header (18 bytes) located at the head of an Ethernet® frame.

The communication packet includes an IP header, a UDP header, and a message (SOME/IP message) specified in the SOME/IP communication. Further, in the SOME/IP-SD communication, the SOME/IP message can include a SOME/IP header and a SOME/IP-SD header. The SOME/IP-SD header includes an Entries Array and an Options Array.

The IP header, the UDP header, the SOME/IP header, and the SOME/IP-SD header are publicly known, and thus, fields constituting these headers will not be described point by point, and only portion relating to characteristic operation of the vehicle control system 1 according to the present embodiment will be described for confirmation to simplify description to facilitate understanding.

A SourceAddress field in the IP header and a SourcePort in the UDP header respectively indicate an IP address and a communication port number of a transmission source device in this communication packet. Further, a DestinationAddress field in the IP header and a DestinationPort in the UDP header respectively indicate an IP address and a communication port number of a transmission destination device (reception device) in this communication packet. Here, the above-described IP address is a local IP address in a LAN (including a VLAN) to which the corresponding device is connected.

The transmission source device can designate an IP address (multicast address) specified in advance which indicates a plurality of transmission destination devices in a predetermined range and transmit the communication packet to the plurality of transmission destination devices through multicast transmission as well as can designate an IP address of a specific transmission destination device in the DestinationAddress field and transmit the communication packet through unicast transmission.

In a ServiceID field of the SOME/IP header, a service ID that identifies a service to be provided from the server device that transmits/receives this packet to the client device is set. Further, in a ClientID field, a device ID that identifies the client device that is to receive provision of the service is set. In a SessionID field, a session ID indicating that communication of this packet is part of a communication session regarding provision of the service identified by the service ID in the ServiceID field, to the device identified by the device ID in the ClientID field is set.

In a case of the SOME/IP-SD communication, in the ServiceID field and a MethodID field of the SOME/IP header, 0xFFFF and 0x8100 are respectively stored as dedicated values indicating that the communication is the SOME/IP-SD communication.

Further, in the ClientID field, in a case of transmission of the SOME/IP-SD message (for example, the FindService message, the OfferService message, the SubscribeEventGroup message, and a SubscribeEventGroupAck message), a fixed value of 0x0000 is set. Further, in a case of transmission of the SOME/IP message (for example, the Event message, the FieldNotification, a Request message, and the a Response message) other than the SOME/IP-SD message, a device ID that identifies the client device that is to receive provision of the service is set in the ClientID field. In the SessionID field, a session ID that distinguishes messages transmitted from the same device from other messages is set.

Further, an IPV4 Address field and a PortNumber field of the SOME/IP-SD header respectively indicate an IP address and a communication port number, which serve as a transmission source address of the SOME/IP-SD message. Note that when an IP packet that carries the SOME/IP message is communicated not in IPV4 but in IPV6, the IPV4 Address field described above is replaced with an IPV6 Address field. Hereinafter, the transmission source address indicated in the IPV4 Address field or the IPV6 Address field will be referred to as an Endpoint address.

FIG. 11 and FIG. 12 are sequence diagrams illustrating outline of communication protocol (SOME/IP communication protocol) in SOME/IP communication. In FIG. 11 and FIG. 12, to facilitate understanding, an example will be described where a device A 41a that is one of the plurality of devices 41 illustrated in FIG. 10 becomes the client device and a device B 41b that is one of the plurality of devices 41 becomes the server device.

In the example in FIG. 11, the device A 41a recognizes the device B 41b as the server device that can provide a requested service and continues communication to request the device B 41b to provide the service.

In FIG. 11, first, the device A 41a transmits a FindService message for searching for the server device that can provide the requested service through multicast transmission within a communication network (S600). By this means, the device A 41a becomes the client device. The FindService message described above is received by all the devices 41 including the device B 41b. Note that in the FindService message, a ServiceID for identifying the service requested by the device A 41a is set in the ServiceID field of the SOME/IP-SD header portion.

The device B 41b that has received the FindService message described above determines that the device B 41b can provide the requested service and transmits, to the device A 41a, an OfferService message for making a notification that the device B 41b can provide the service (S602). By this means, the device B 41b becomes the server device.

By the device A 41a receiving the OfferService message that has been transmitted from the device B 41b, the device A 41a recognizes the device B 41b as the server device that can provide the requested service. By this means, communication for providing and receiving the above-described service is established between the device A 41a as the client device and the device B 41b as the server device.

Subsequently, the device A 41a that has received the OfferService message transmitted from the device B 41b transmits to the device B 41b, a SubscribeEventGroup message for requesting provision of the service (S604). The device B 41b transmits to the device A 41a, a SubscribeEventGroupAck message that is an acknowledgement in response to reception of the SubscribeEventGroup message from the device A 41a (S606).

Thereafter, the device B 41b transmits data regarding the requested service to the device A 41a as an Event message or a FieldNotification message at a predetermined timing (S608, S610). Here, the Event message is a message to be used to transmit data when some kind of event occurs such as when a transmission timing at predetermined time intervals has come, and when a value of a predetermined data item has changed or updated. Further, the FieldNotification message is a message to be used to make a notification of information (such as, for example, transmission rate information of a camera image) that determines data transmission conditions, and the like, when the information has been changed.

FIG. 12 is a sequence diagram illustrating another example of the SOME/IP communication protocol. In the example in FIG. 12, the device A 41a recognizes the device B 41b as the server device that can provide the requested service and then transmits a request for provision of the service to the device B 41b at a timing at which the device A 41a desires to request provision of the service, and the device B 41b provides the service as a response every time the request for provision is received. Note that in FIG. 12, processing that is the same as the processing in FIG. 11 will be indicated with the same reference numerals as the reference numerals in FIG. 11, and the description in FIG. 11 described above will be employed.

In FIG. 12, after the FindService message and the OfferService message are exchanged between the device A 41a and the device B 41b in a similar manner to FIG. 11, the device A 41a transmits a Request message that is a request for provision of the service to the device B 41b (S612). Then, the device B 41b transmits data of the requested service to the device A 41a on a Response message in response to reception of the Request message from the device A 41a (S614). Thereafter, provision and reception of the above-described Request message and Response message are repeated between the device A 41a and the device B 41b at a timing at which the device A 41a requests provision of the service (S616, S618).

Here, in FIG. 11 and FIG. 12, while a communication session is started by the device A 41a as the client device that requests the service transmitting the FindService message, the communication session may be started by transmission of the OfferService message from the device B 41b that becomes the server device without the FindService message being transmitted. In this case, the device B 41b first transmits the OfferService message indicating that the device B 41b can provide a specific service through multicast transmission within a communication network. The device A 41a that requires provision of the service among the devices 41 that have received this OfferService message becomes the client device by transmitting a SubscribeEventGroup message or a Request message to the device B 41b.

3. Communication Management Device

When the communication management device 5 receives a message from a control device (the ECU 6 or the ECU 7)

of one of the first control device group 3 and the second control device group 4, the communication management device 5 performs authentication processing on the control device.

Further, when validity of the control device that has transmitted the above-described message can be authenticated in the above-described authentication processing, the communication management device 5 generates and transmits a relay message for relaying the message (for example, the OfferService message) received from one control device (for example, the ECU 6) that is a control device of one of the control device groups to a control device (for example, the ECU 7) of the other of the control device groups. In this event, the communication management device 5 includes a communication address of the one control device in the relay message as a transmission source address.

This enables the control device of the other of the control device groups to perform communication with the one control device via the routing device 8 by using the communication address of the one control device included in the above-described relay message without interposition of the communication management device 5.

Further, when validity of the control device that has transmitted the above-described message can be authenticated in the above-described authentication processing, the communication management device 5 determines a communication address of the other control device (for example, the ECU 7) with which the one control device (for example, the ECU 6) should perform communication on the basis of service information 24 (which will be described later) that is device information of the respective control devices, the other control device being the control device of the other of the control device groups, and the one control device being the control device of one of the control device groups that has transmitted the message (for example, the FindService message). Then, the communication management device transmits a return message (for example, the OfferService message) including the determined communication address of the other control device as the transmission source address to the one control device on behalf of the other control device.

By this means, the one control device can start communication with the other control device via the routing device 8 by using the communication address of the other control device included in the above-described return message without interposition of the communication management device 5.

[3.1 Configuration of Communication Management Device]

A configuration of the communication management device 5 will be described.

Hereinafter, communication addresses respectively set in the SourceAddress field and the DestinationAddress field in the IP header of an IP packet that carries a message will be respectively referred to as a "transmission source address of the IP packet" and a "transmission destination address of the IP packet". Further, in the present specification, a communication address set in the IPV4 Address field (or the IPV6 Address field) in the SOME/IP-SD header of each of the SOME/IP-SD messages including the FindService message, the OfferService message, the SubscribeEventGroup message, and the SubscribeEventGroupAck message will be referred to as a "transmission source address of the message" or an "Endpoint address". By this means, the transmission source address of the IP packet will be described in distinction from the transmission source address included in the message.

Referring to FIG. 1, the communication management device 5 includes a processor 20, a memory 21, a first communication device 22a and a second communication device 22b.

The first communication device 22a and the second communication device 22b are respectively wired communication devices (transmitters/receivers, circuits) for the first processing device 26 and the second processing device 27 which will be described later to perform communication. The first communication device 22a and the second communication device 22b are respectively connected to the routing device 8. The first processing device 26 and the second processing device 27 perform communication conforming to the SOME/IP communication standards via the routing device 8 by the first communication device 22a and the second communication device 22b. As described above, the first processing device 26 constitutes the first communication network 9 with each ECU 6 of the first control device group 3, and the second processing device 27 constitutes the second communication network 10 with each ECU 7 of the second control device group 4.

The memory 21 is, for example, constituted with a volatile and/or non-volatile semiconductor memory, and/or a hard disk device, or the like. In the memory 21, identification information 23 and service information 24 are stored.

In the identification information 23, a list of communication addresses (in the present embodiment, IP addresses, the same applies below) of legitimate ECU 6 and ECU 7 is stored as a legitimate address list. Further, in the service information 24, a list of service IDs (service IDs of services that can be provided) of services that can be respectively provided by the ECU 6 and the ECU 7 is stored in association with the communication addresses of the ECU 6 and the ECU 7. The service information 24 corresponds to device information for the respective control devices of the two control device groups in the present disclosure. The service information 24 further includes information as to whether each of the ECU 6 and the ECU 7 is a device that provides a service (that is, provides a service using the Event message and/or the FieldNotification message as illustrated in FIG. 11) in response to reception of the SubscribeEventGroup message or a device that provides a service (that is, provides a service using the Response message as illustrated in FIG. 12) in response to reception of the Request message.

The processor 20 is, for example, a computer including a CPU, and the like. The processor 20 may include a ROM in which a program is written, a RAM for temporarily storing data, and the like. Further, the processor 20 includes the first processing device 26 and the second processing device 27 as functional components or functional units.

The first processing device 26 and the second processing device 27 perform processing independently from each other and cooperate with each other to manage communication between the ECU 6 of the first control device group 3 that constitutes the first communication network 9 and the ECU 7 of the second control device group 4 that constitutes the second communication network 10.

The first processing device 26 is, for example, implemented as a so-called physical machine by the processor 20 that is a computer executing a first program 25a including an operating system (OS) stored in the memory 21. Further, for example, the second processing device 27 is implemented as a so-called virtual machine by the processor 20 that is a computer executing a second program 25b including the OS stored in the memory 21.

By this means, the first processing device 26 and the second processing device 27 can operate as computers that are independent of each other.

Specifically, the first processing device 26 is implemented on hardware of the processor 20 within the processor 20 and starts operation by the processor 20 executing the first program 25a. In this event, by the processor 20 executing the OS included in the first program 25a, a virtual machine platform provided by the OS is formed within the processor 20.

Then, by the processor 20 executing the second program 25b on the above-described virtual machine platform, the second processing device 27 as the virtual machine is implemented.

In other words, the OS to be provided by the first program 25a is a so-called host OS, and the OS to be provided by the second program 25b is a so-called quest OS that is to be executed on the virtual machine platform provided by the host OS.

Note that the first program 25a and the second program 25b may be stored in a computer-readable arbitrary storage medium.

The first processing device 26 includes a first authentication unit 30 and a first communication control unit 31 as functional components or functional units. These functional components are implemented by the processor 20 executing the above-described first program 25a.

Further, the second processing device 27 includes a second authentication unit 32 and a second communication control unit 33 as functional components or functional units. These functional components are implemented by the processor 20 executing the above-described second program 25b.

The first processing device 26 and the second processing device of the communication management device 5 cooperate with each other to perform authentication processing for one control device (for example, one ECU 6 or ECU 7) of the first control device group 3 and the second control device 4 when a message is received from the control device.

Further, when validity of the control device can be authenticated in the above-described authentication processing, the first processing device 26 and the second processing device cooperate with each other to generate and transmit a relay message for relaying the message received from one control device that is a control device of one of the control device groups to a control device of the other of the control device groups. In this event, the first processing device 26 includes a communication address of the one control device in the relay message as a transmission source address.

Further, when validity of the control device can be authenticated in the above-described authentication processing, the first processing device 26 and the second processing device cooperate with each other to determine a communication address of the other control device with which the one control device should perform communication on the basis of the service information 24 that is device information of the respective control devices, the other control device being the control device of the other of the control device groups, and the one control device being the control device of the one of the control device groups that has transmitted the message (for example, the FindService message). Further, the first processing device 26 and the second processing device transmit a return message (for example, the OfferService message) including the determined communication address of the other control device as the transmission source address to the one control device on behalf of the other control device.

[3.2 Operation of Communication Management Device]

Next, operation of the first authentication unit 30 and the first communication control unit 31 of the first processing device 26, and operation of the second authentication unit 32 and the second communication control unit 33 of the second processing device 27 will be described with reference to the sequence diagrams illustrated in FIG. 2, FIG. 3, FIG. 4, FIG. 5, FIG. 6, FIG. 7, FIG. 8, and FIG. 9 illustrating eight examples of processing procedure in the vehicle control system 1.

[3.2.1 First Example of Communication Procedure]

Figure 2:
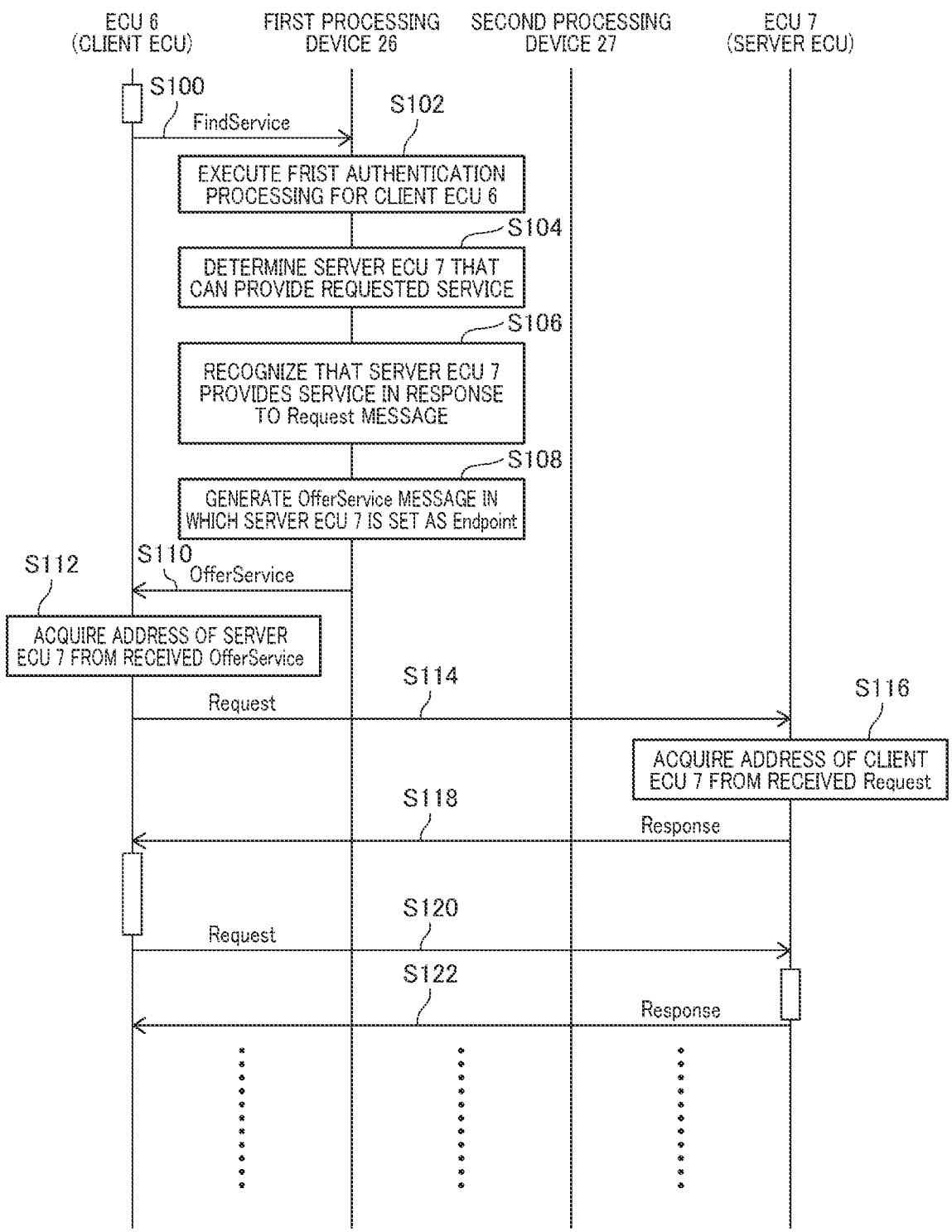
FIG. 2 is a sequence diagram illustrating a first example of communication procedure in the vehicle control system.

FIG. 2 is a first example of SOME/IP communication. The SOME/IP communication illustrated in FIG. 2 is started by being triggered by one ECU 6 of the first control device group 3 transmitting a FindService message through multicast transmission to request a specific service, and the ECU 6 transmits a Request message while determining one ECU 7 of the second control device group 4 that provides the above-described specific service and receives provision of the service from the ECU 7 using a Response message.

In FIG. 2, first, one ECU 6 of the first control device group 3 which requests provision of a service (requested service) necessary for performing some kind of control regarding motion control of the vehicle 2, transmits the FindService message for searching for a server device that can provide the requested service through multicast transmission within the first communication network 9 (S100). Hereinafter, the ECU 6 that has transmitted the FindService message will be referred to as a client ECU 6.

The first authentication unit 30 of the first processing device 26 that has received the FindService message from the client ECU 6 executes first authentication processing for the client ECU 6 (S102). The first authentication unit 30 performs the above-described first authentication processing by determining whether or not the transmission source address of the message included in the received FindService message is included in the legitimate address list of the identification information 23 stored in the memory 21. Note that the first authentication unit 30 finishes the processing illustrated in FIG. 2 when validity of the client ECU 6 cannot be authenticated in the first authentication processing (not illustrated in FIG. 2).

Subsequently, the first communication control unit 31 of the first processing device 26 determines the ECU 7 that can provide the service requested by the client ECU 6 (S104). Specifically, the first communication control unit 31 acquires a service ID of the requested service from the ServiceID of the FindService message. Further, the first communication control unit 31 determines a communication address of the ECU 7 including the acquired service ID as the service ID of the service that can be provided with reference to the service information 24 stored in the memory 21. Further, the first communication control unit 31 recognizes from the service information 24 that the above-described determined ECU 7 is a device that provides the service regarding the requested service in response to reception of a Request message (S106). Hereinafter, the ECU 7 that can provide the requested service will be referred to as a server ECU 7.

Then, the first communication control unit 31 generates an OfferService message in which the communication address of the server ECU 7 is set as the Endpoint address on behalf of the determined server ECU 7 in response to the recognition regarding provision of the service by the server ECU 7 (S108) and returns the generated OfferService message to the client ECU 6 (S110). The client ECU 6 that has received the above-described OfferService message acquires the communication address of the server ECU 7 that is a communication partner from the Endpoint address of the received OfferService message (S112).

Subsequently, the client ECU 6 transmits a Request message to the server ECU 7 via the routing device 8 using the acquired communication address of the server ECU 7 as a transmission destination address of the IP packet without interposition of the first processing device 26 and the second processing device 27 of the communication management device 5 (S114). The server ECU 7 that has received the above-described Request message acquires the communication address of the client ECU 6 that is a communication partner from the transmission source address of the IP packet of the received Request message (S116).

Subsequently, the server ECU 7 transmits a Response message to the client ECU 7 via the routing device 8 using the acquired communication address of the client ECU 6 as a transmission destination address of the IP packet without interposition of the first processing device 26 and the second processing device 27 of the communication management device 5 (S118).

Thereafter, the client ECU 6 and the server ECU 7 repeat exchange of a Request message and a Response message directly via the routing device 8 by respectively using the communication addresses of each other acquired in step S112 and step S116 in accordance with the related art without interposition of the communication management device 5 (S120, S122).

Here, in the example illustrated in FIG. 2, the client ECU 6 and the server ECU 7 respectively correspond to "one control device" and "the other control device with which the one control device should perform communication" in the present disclosure. Further, the FindService message transmitted in step S100 and the OfferService message transmitted in step S110 respectively correspond to a "message received from the one control device" and a "return message in response to the message received from the one control device" in the present disclosure.

Further, in FIG. 2, step S102 corresponds to an authentication processing step in the present disclosure, and step S104 corresponds to a determination step. Further, step S108 and step S110 correspond to a return transmission step, and step S114, step S118, step S120, and step S122 correspond to a second direct communication step.

[3.2.2 Second Example of Communication Procedure]

Figure 3:
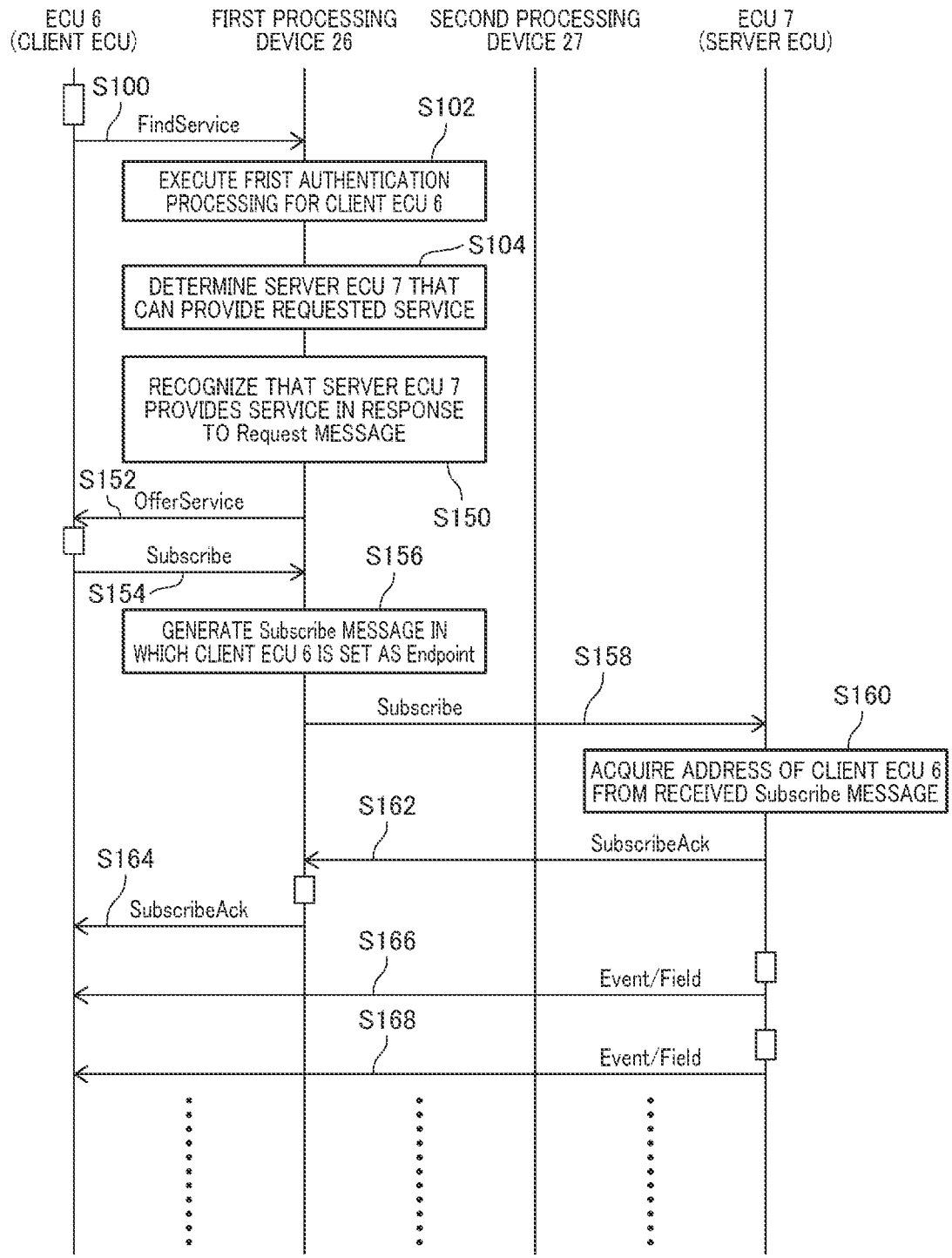
FIG. 3 is a sequence diagram illustrating a second example of the communication procedure in the vehicle control system.

FIG. 3 is a second example of the SOME/IP communication. The SOME/IP communication illustrated in FIG. 3 is started by being triggered by one ECU 6 of the first control device group 3 transmitting a FindService message through multicast transmission to request a specific service, and the ECU 6 receives provision of the service using an Event message and/or a FieldNotification message from one ECU 7 of the second control device group 4 that provides the above-described specific service.

Note that in FIG. 3, processing step that is the same as the processing step illustrated in FIG. 2 will be indicated with the same reference numerals as the reference numerals illustrated in FIG. 2, and description regarding FIG. 2 described above will be employed.

In the example illustrated in FIG. 3, the first communication control unit 31 of the first processing device 26 determines the server ECU 7 that can provide the requested service in step S104 and then recognizes that the determined server ECU 7 is a device that provides the service regarding the requested service in response to reception of a SubscribeEventGroup message (in the accompanying drawings, abbreviated as "Subscribe" or "Subscribe message") (S150). Then, the first communication control unit 31 transmits an OfferService message in which the communication address of the first processing device 26 itself is set as the Endpoint address to the client ECU 6 in response to the above-described recognition regarding provision of the service by the server ECU 7 in accordance with the related art (S152).

The client ECU 6 that has received this OfferService message transmits the SubscribeEventGroup message in which the communication address of the client ECU 6 itself is set as the Endpoint address to the first processing device 26 that is the transmission source of the above-described OfferService message in accordance with the related art (S154).

The first communication control unit 31 of the first processing device 26 generates a SubscribeEventGroup message in which the communication address of the client ECU 6 is set as the Endpoint address on behalf of the client ECU 6 that is the transmission source in response to reception of the above-described SubscribeEventGroup message (S156) and transmits the generated SubscribeEventGroup message to the server ECU 7 determined in step S104 (S158).

The server ECU 7 receives the above-described SubscribeEventGroup message and acquires the communication address of the client ECU 6 that becomes a communication partner to which the service is to be provided from the Endpoint address of the received SubscribeEventGroup message (S160). The server ECU 7 transmits a SubscribeEventGroupAck message (in the accompanying drawings, abbreviated as "SubscribeAck") to the first processing device 26 as an acknowledgement in response to the SubscribeEventGroup message transmitted in step S158 (step S162).

The first communication control unit 31 of the first processing device 26 receives the SubscribeEventGroupAck message transmitted in step S162. The first communication control unit 31 transmits a SubscribeEventGroupAck message in which the communication address of the first processing device 26 itself is set as the Endpoint address to the client ECU 6 in response to reception of the above-described SubscribeEventGroupAck message in accordance with the related art (S164). This SubscribeEventGroupAck message is a response message in response to the SubscribeEventGroup message transmitted from the client ECU 6 in step S154.

Thereafter, the server ECU 7 can directly transmit a message to the client ECU 6 via the routing device 8 by using the communication address of the client ECU 6 acquired in step S160 without interposition of the first processing device 26 and the second processing device 27 of the communication management device 5. Thus, thereafter, the server ECU 7 transmits data regarding the service to be provided to the client ECU 6 using an Event message and/or a FieldNotification message at predetermined timings without interposition of the communication management device 5, and the client ECU 6 receives these messages (S166, S168).

The client ECU 6 and the SubscribeEventGroup message transmitted in step S154 in the example illustrated in FIG. 3 respectively correspond to "one control device" and a "message received from the one control device" in the present disclosure. Further, the SubscribeEventGroup message transmitted in step S158 corresponds to a "relay message for relaying the message received from the one control device to the control device of the other of the control device groups" in the present disclosure.

Further, in FIG. 3, step S156 and step S158 correspond to a relay transmission step in the present disclosure, and step S166 and step S168 correspond to a first direct communication step.

[3.2.3 Third Example of Communication Procedure]

Figure 4:
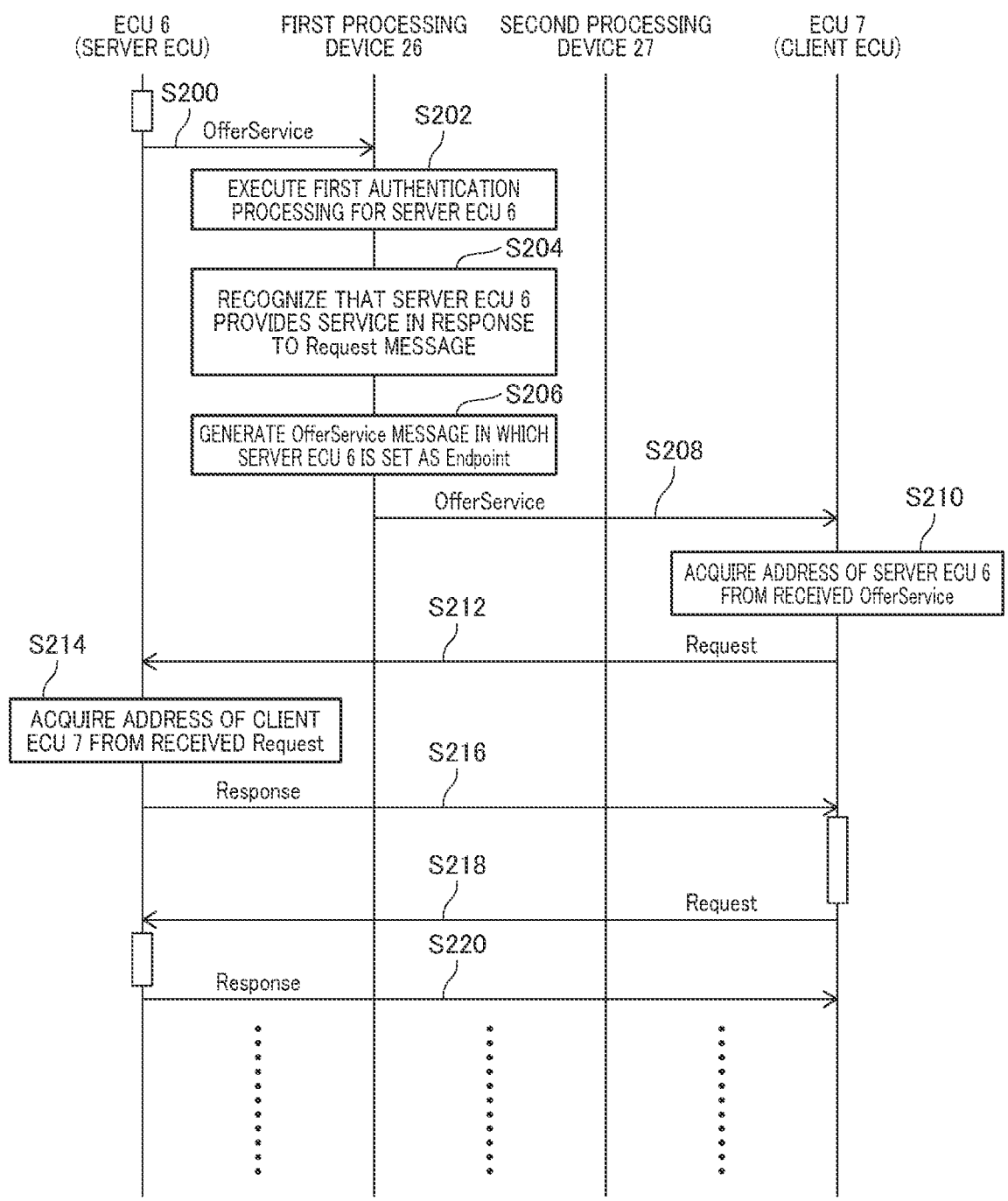
FIG. 4 is a sequence diagram illustrating a third example of the communication procedure in the vehicle control system.

FIG. 4 is a third example of the SOME/IP communication. The SOME/IP communication illustrated in FIG. 4 is started by being triggered by one ECU 6 of the first control device group 3 transmitting an OfferService message indicating that the ECU 6 can provide a specific service through multicast transmission, and the ECU 6 receives a Request message from one ECU 7 of the second control device group 4 that requires the above-described specific service and provides the service to the ECU 7 using a Response message.

In FIG. 4, first, one ECU 6 of the first control device group 3 transmits an OfferService message indicating that the ECU 6 can provide a specific service through multicast transmission within the first communication network 9 (S200). Hereinafter, the above-described specific service will be referred to as a service to be provided, and the ECU 6 that has transmitted the above-described OfferService message will be referred to as the server ECU 6.

The first authentication unit 30 of the first processing device 26 that has received the OfferService message from the server ECU 6 executes first authentication processing for the server ECU 6 (S202). The first authentication unit 30 finishes the processing illustrated in FIG. 4 when validity of the server ECU 6 cannot be authenticated in the first authentication processing (not illustrated in FIG. 4).

Then, the first communication control unit 31 recognizes from the service information 24 that the server ECU 6 is a device that provides the service regarding the above-described service to be provided in response to reception of a Request message (S204).

The first communication control unit 31 generates an OfferService message in which the communication address of the server ECU 6 is set as the Endpoint address on behalf of the server ECU 6 that has transmitted the OfferService message in step S200 in response to the recognition regarding provision of the service by the server ECU 6 (S206) and transmits the generated OfferService message to the respective ECUs 7 within the second communication network 10 through multicast transmission (S208).

In step S208, the OfferService message transmitted through multicast transmission is received by the respective ECUs 7. One ECU 7 that requires the service to be provided (hereinafter, referred to as the client ECU 7) indicated by the service ID of the OfferService message among the ECUs 7 within the second communication network 10 acquires the communication address of the server ECU 6 that is a communication partner from the Endpoint address of the OfferService message (S210).

The client ECU 7 transmits a Request message to the server ECU 6 using the acquired communication address of the server ECU 6 as a transmission destination address of the IP packet (S212). This Request message is received by the server ECU 6 via the routing device 8 without interposition of the first processing device 26 and the second processing device 27 of the communication management device 5.

The server ECU 6 that has received the above-described Request message acquires the communication address of the client ECU 7 that is a communication partner from the transmission source address of the IP packet of the received Request message (S214). The server ECU 6 transmits a Response message to the client ECU 7 via the routing device 8 using the acquired communication address of the client ECU 7 as the transmission destination address of the IP packet without interposition of the first processing device 26 and the second processing device 27 of the communication management device 5 (S216).

Thereafter, the client ECU 7 and the server ECU 6 repeat exchange of a Request message and a Response message directly via the routing device 8 by respectively using the communication addresses of each other acquired in step S210 and step S214 without interposition of the communication management device 5 in accordance with the related art (S218, S220).

Here, in the example illustrated in FIG. 4, the server ECU 6 and the OfferService message transmitted in step S200 and received by the first processing device 26 respectively correspond to "one control device" and a "message received from the one control device" in the present disclosure. Further, the OfferService message transmitted in step S208 corresponds to a "relay message for relaying the message to the control device of the other of the control device groups on the basis of the message received from the one control device" in the present disclosure.

Further, in FIG. 4, step S202 corresponds to an authentication processing step in the present disclosure, step S206 and step S208 correspond to a relay transmission step, and step S212, step S216, step S218, and step S220 correspond to a first direct communication step.

[3.2.4 Fourth Example of Communication Procedure]

Figure 5:
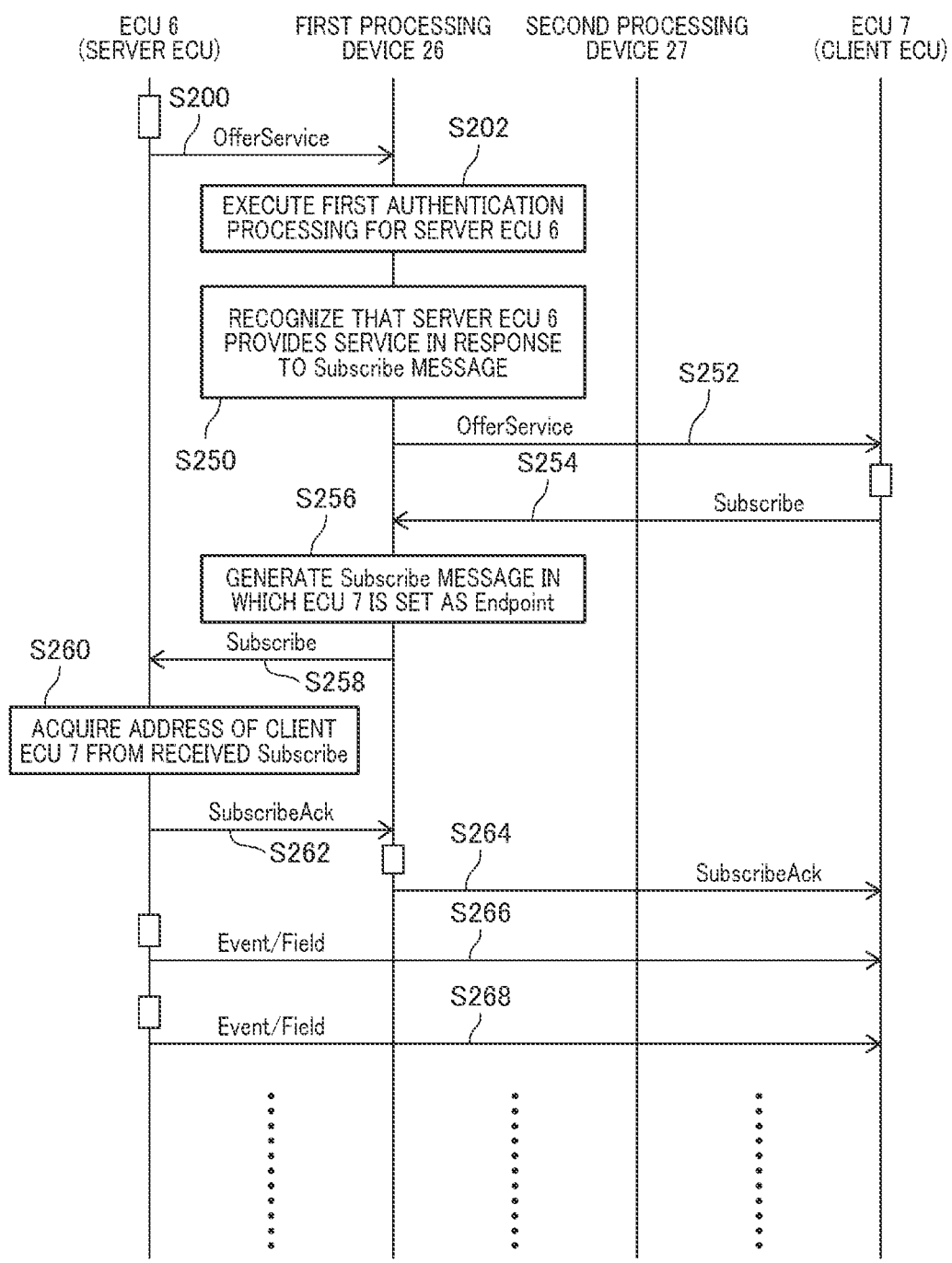
FIG. 5 is a sequence diagram illustrating a fourth example of the communication procedure in the vehicle control system.

FIG. 5 is a fourth example of the SOME/IP communication. The SOME/IP communication illustrated in FIG. 5 is started by being triggered by one ECU 6 of the first control device group 3 transmitting an OfferService message indicating that the ECU 6 can provide a specific service through multicast transmission, and the ECU 6 provides the service to one ECU 7 of the second control device group 4 that requires the above-described specific service using an Event message and/or a FieldNotification message.

Note that in FIG. 5, processing step that is the same as the processing step illustrated in FIG. 4 will be indicated with the same reference numerals as the reference numerals illustrated in FIG. 4, and description regarding FIG. 4 described above will be employed.

In the example illustrated in FIG. 5, the first communication control unit 31 of the first processing device 26 executes first authentication processing for the server ECU 6 in step S202 and then recognizes from the service information 24 that the server ECU 6 is a device that provides the service regarding the service to be provided in response to reception of a SubscribeEventGroup message (S250).

Then, the first communication control unit 31 transmits an OfferService message in which the communication address of the first processing device 26 is set as the Endpoint address to the respective ECUs 7 within the second communication network 10 through multicast transmission in response to the above-described recognition regarding provision of the service by the server ECU 6 in accordance with the related art (S252).

The OfferService message transmitted in step S252 through multicast transmission is received by the respective ECUs 7. Among the ECUs 7 within the second communication network 10, one ECU 7 that requires the service to be provided (hereinafter, referred to as the client ECU 7) indicated by the service ID of the OfferService message transmits a SubscribeEventGroup message in which the communication address of the client ECU 7 itself is set as the Endpoint to the first processing device 26 that is the transmission source of the above-described OfferService message in accordance with the related art (S254).

The first communication control unit 31 of the first processing device 26 generates a SubscribeEventGroup message in which the communication address of the client ECU 7 is set as the Endpoint address in response to reception of the above-described SubscribeEventGroup message on behalf of the client ECU 7 that is the transmission source of the SubscribeEventGroup message (S256) and transmits the generated SubscribeEventGroup message to the server ECU 6 that is the transmission source of the OfferService message in step S200 (S258).

The server ECU 6 receives the above-described SubscribeEventGroup message and acquires the communication address of the client ECU 7 that becomes a communication partner to which the service is to be provided from the Endpoint address of the received SubscribeEventGroup message (S260). The server ECU 6 transmits a SubscribeEventGroupAck message that is an acknowledgement in response to the SubscribeEventGroup message transmitted in step S258 to the first processing device 26 that is the transmission source of the SubscribeEventGroup message in accordance with the related art (S262).

The first communication control unit 31 of the first processing device 26 receives the SubscribeEventGroupAck message transmitted in step S262. The first communication control unit 31 transmits a SubscribeEventGroupAck message in which the communication address of the first processing device 26 itself is set as the Endpoint address to the client ECU 7 in response to reception of the above-described SubscribeEventGroupAck message in accordance with the related art (S264). This SubscribeEventGroupAck message is a response message in response to the SubscribeEventGroup message transmitted by the client ECU 7 in step S254.

Thereafter, the server ECU 6 can directly transmit a message to the client ECU 7 via the routing device 8 by using the communication address of the client ECU 7 acquired in step S260 without interposition of the first processing device 26 and the second processing device 27 of the communication management device 5. Thus, thereafter, the server ECU 6 continuously transmits data regarding the service to be provided to the client ECU 7 at predetermined timings using an Event message and/or a FieldNotification message without interposition of the communication management device 5, and the client ECU 7 receives these messages (S266, S268).

In the example illustrated in FIG. 5, the client ECU 7, the SubscribeEventGroup message to be transmitted in step S254, and the SubscribeEventGroup message to be transmitted in step S258 respectively correspond to "one control device", a "message received from the one control device" and a "relay message for relaying the message to the control device of the other of the control device groups on the basis of the message received from the one control device" in the present disclosure.

Further, in FIG. 5, step S256 and step S258 correspond to a relay transmission step in the present disclosure, and step S266 and step S268 correspond to a first direct communication step.

[3.2.5 Fifth Example of Communication Procedure]

Figure 6:
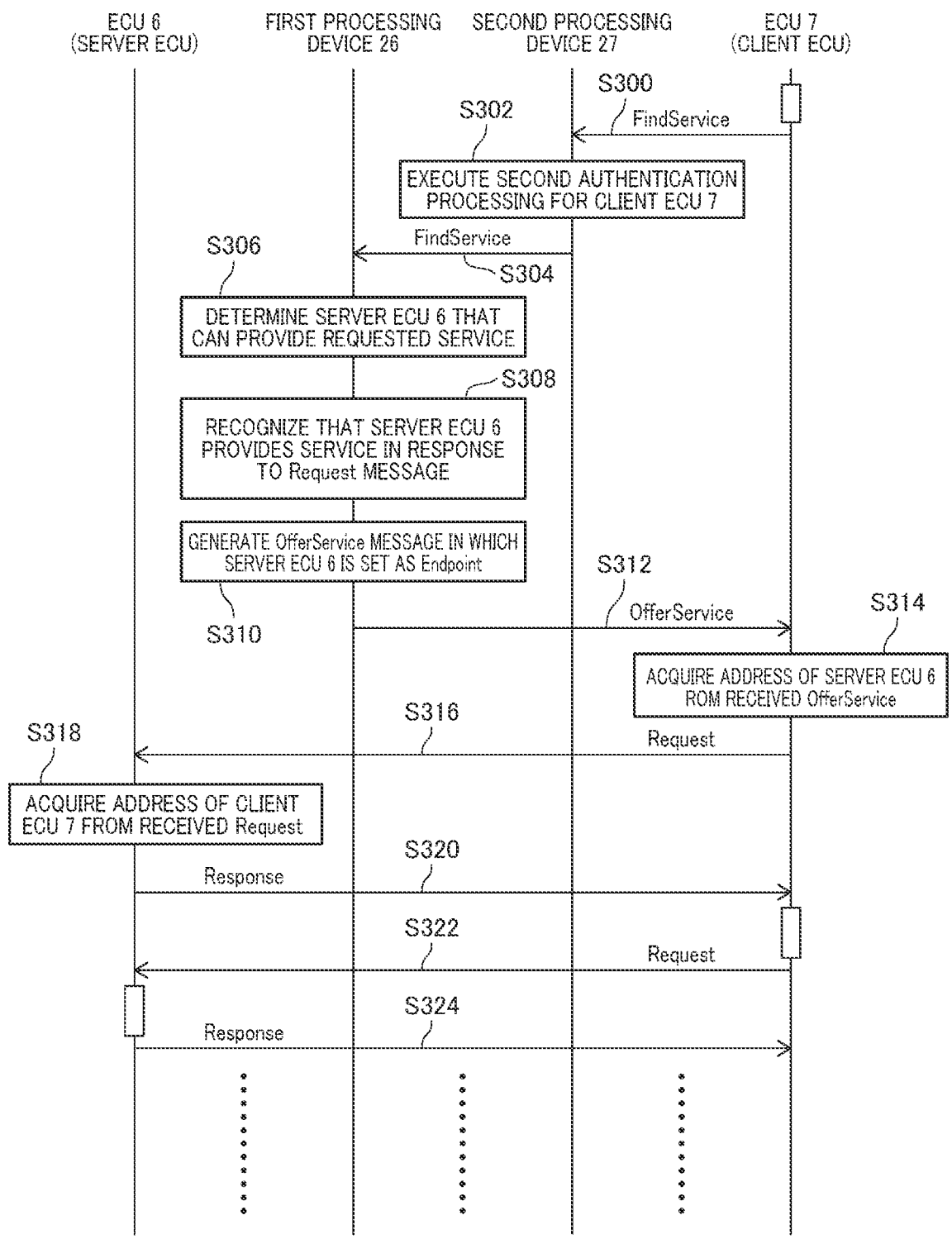
FIG. 6 is a sequence diagram illustrating a fifth example of the communication procedure in the vehicle control system.

FIG. 6 is a fifth example of the SOME/IP communication. The SOME/IP communication illustrated in FIG. 6 is started by being triggered by one ECU 7 of the second control device group 4 transmitting a FindService message through multicast transmission to request a specific service, and the ECU 7 transmits a Request message while determining one ECU 6 of the first control device group 3 that provides the above-described specific service and receives provision of the service from the ECU 6 using a Response message.

In FIG. 6, first, one ECU 6 of the second control device group 4 which requests provision of a specific service (requested service) for control operation, transmits a FindService message for searching for a server device that can provide the requested service through multicast transmission within the second communication network 10 (S300). The second processing device 27 within the second communication network 10 receives the above-described FindService message transmitted through multicast transmission. Hereinafter, the ECU 7 that has transmitted the above-described FindService message through multicast transmission will be referred to as a client ECU 7.

The second authentication unit 32 of the second processing device 27 that has received the FindService message from the client ECU 7 executes second authentication processing for the client ECU 7 (S302). The second authentication unit 32 performs the above-described second authentication processing by determining whether or not a transmission source address of the message included in the received FindService message is included in the legitimate address list of the identification information 23 stored in the memory 21. Note that the second authentication unit 32 finishes the processing illustrated in FIG. 6 when validity of the client ECU 7 cannot be authenticated in the second authentication processing (not illustrated in FIG. 6).

Subsequently, the second communication control unit 33 of the second processing device 27 transfers the FindService message from the client ECU 7 to the first processing device 26 (S304).

The first communication control unit 31 of the first processing device 26 determines the ECU 6 that can provide the requested service requested by the client ECU 7 on the basis of the transferred FindService message (S306). Specifically, the first communication control unit 31 acquires a service ID of the above-described requested service from the ServiceID of the above-described FindService message. Then, the first communication control unit 31 determines the communication address of the ECU 6 including the acquired service ID as the service ID of the service that can be provided with reference to the service information 24 stored in the memory 21. Further, the first communication control unit 31 recognizes from the service information 24 that the above-described determined ECU 6 is a device that provides the service regarding the requested service in response to reception of a Request message (S308). Hereinafter, the ECU 6 that can provide the requested service requested by the client ECU 7 will be referred to as a server ECU 6.

Then, the first communication control unit 31 generates an OfferService message in which the communication address of the server ECU 6 is set as the Endpoint address on behalf of the determined server ECU 6 in response to the above-described recognition regarding provision of the service by the server ECU 6 (S310) and returns the generated OfferService message to the client ECU 7 (S312). The client ECU 7 that has received the above-described OfferService message acquires the communication address of the server ECU 6 that is a communication partner from the Endpoint address of the received OfferService message (S314).

Subsequently, the client ECU 7 transmits a Request message to the server ECU 7 via the routing device 8 using the acquired communication address of the server ECU 6 as a transmission destination address of the IP packet without interposition of the first processing device 26 and the second processing device 27 of the communication management device 5 (S316). The server ECU 6 that has received the Request message acquires the communication address of the client ECU 7 that is a communication partner from the transmission source address of the IP packet of the received Request message (S318).

Subsequently, the server ECU 6 transmits a Response message to the client ECU 7 via the routing device 8 using the acquired communication address of the client ECU 7 as a transmission destination address of the IP packet without interposition of the first processing device 26 and the second processing device 27 of the communication management device 5 (S320).

Thereafter, the client ECU 7 and the server ECU 6 repeat exchange of a Request message and a Response message directly via the routing device 8 by respectively using the communication addresses of each other acquired in step S314 and step S318 without interposition of the communication management device 5 in accordance with the related art (S322, S324).

Here, in the example illustrated in FIG. 6, the client ECU 7 and the server ECU 6 respectively correspond to "one control device" and "the other control device with which the one control device should perform communication" in the present disclosure. Further, the FindService message transmitted in step S300 and the OfferService message transmitted in step S312 respectively correspond to a "message received from the one control device" and a "return message in response to the message received from the one control device" in the present disclosure.

Further, in FIG. 6, step S302 corresponds to an authentication processing step in the present disclosure, and step S306 corresponds to a determination step. Still further, step S310 and step S312 correspond to a return transmission step, and step S316, step S320, step S322, and step S324 correspond to a second direct communication step.

[3.2.6 Sixth Example of Communication Procedure]

Figure 7:
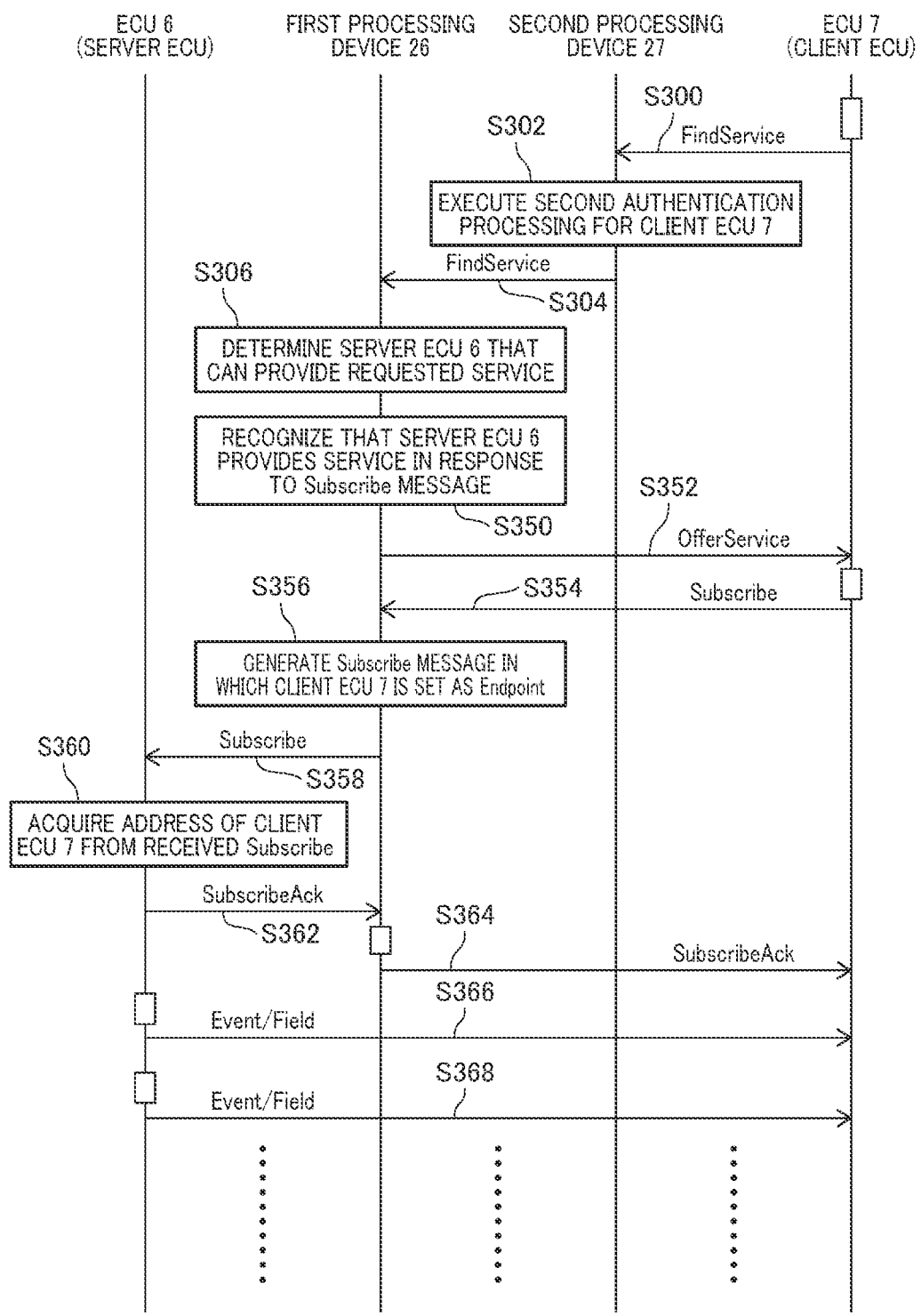
FIG. 7 is a sequence diagram illustrating a sixth example of the communication procedure in the vehicle control system.

FIG. 7 is a sixth example of the SOME/IP communication. The SOME/IP communication illustrated in FIG. 7 is started by being triggered by one ECU 7 of the second control device group 4 transmitting a FindService message through multicast transmission to request a specific service, and the ECU 7 receives provision of the service from one ECU 6 of the first control device group 3 that provides the above-described specific service using an Event message and/or a FieldNotification message.

Note that in FIG. 7, processing step that is the same as the processing step illustrated in FIG. 6 will be indicated with the same reference numerals as the reference numerals in FIG. 6, and description regarding FIG. 6 described above will be employed.

In the example illustrated in FIG. 7, the first communication control unit 31 of the first processing device 26 determines the server ECU 6 that can provide the requested service in step S306 and then recognizes from the service information 24 that the server ECU 6 is a device that provides the service regarding the requested service in response to reception of a SubscribeEventGroup message (S350). Then, the first communication control unit 31 transmits an OfferService message in which the communication address of the first processing device 26 itself is set as the Endpoint address to the client ECU 7 in response to the above-described recognition regarding provision of the service by the server ECU 6 in accordance with the related art (S352).

The client ECU 7 that has received this OfferService message transmits a SubscribeEventGroup message in which the communication address of the client ECU 7 itself is set as the Endpoint address to the first processing device 26 that is the transmission source of the above-described OfferService message in accordance with the related art (S354).

The first communication control unit 31 of the first processing device 26 generates a SubscribeEventGroup message in which the communication address of the client ECU 7 is set as the Endpoint address in response to reception of the above-described SubscribeEventGroup message on behalf of the client ECU 7 that is the transmission source of the SubscribeEventGroup message (S356) and transmits the generated SubscribeEventGroup message to the server ECU 6 determined in step S306 (S358).

The server ECU 6 receives the above-described SubscribeEventGroup message and acquires the communication address of the client ECU 7 that becomes the communication partner to which the service is to be provided from the Endpoint address of the received SubscribeEventGroup message (S360). The server ECU 6 transmits a SubscribeEventGroupAck message to the first processing device 26 as an acknowledgement in response to the SubscribeEventGroup message transmitted in step S358 (S362).

The first communication control unit 31 of the first processing device 26 receives the SubscribeEventGroupAck message transmitted in step S362. The first communication control unit 31 transmits a SubscribeEventGroupAck message in which the communication address of the first processing device 26 itself is set as the Endpoint address to the client ECU 7 in response to reception of the above-described SubscribeEventGroupAck message in accordance with the related art (S364). This SubscribeEventGroupAck message is a response message in response to the SubscribeEventGroup message transmitted by the client ECU 7 in step S354.

Thereafter, the server ECU 7 can directly transmit a message to the client ECU 7 via the routing device 8 by using the communication address of the client ECU 7 acquired in step S360 without interposition of the first processing device 26 and the second processing device 27 of the communication management device 5. Thus, thereafter, the server ECU 6 continuously transmits data regarding the service to be provided to the client ECU 7 at predetermined timings using an Event message and/or a FieldNotification message without interposition of the communication management device 5, and the client ECU 7 receives these messages (S366, S368).

The client ECU 7 and the SubscribeEventGroup message to be transmitted in step S354 in the example illustrated in FIG. 7 respectively correspond to "one control device" and a "message received from the one control device" in the present disclosure. Further, the SubscribeEventGroup message to be transmitted in step S358 corresponds to a "relay message for relaying the message received from the one control device to the control device of the other of the control device groups" in the present disclosure.

Further, in FIG. 7, step S356 and step S358 correspond to a relay transmission step in the present disclosure, and step S366 and step S368 correspond to a first direct communication step.

[3.2.7 Seventh Example of Communication Procedure]

Figure 8:
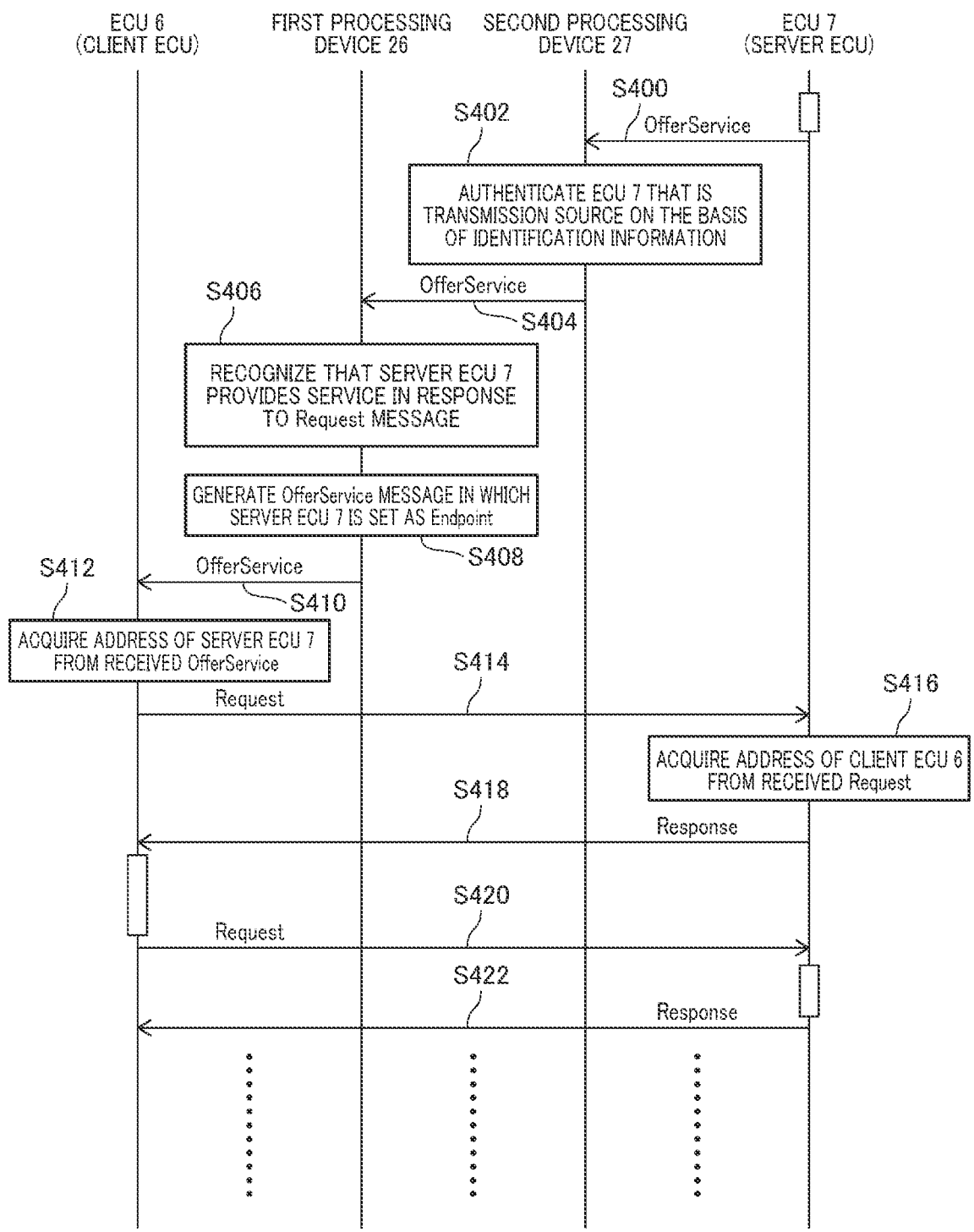
FIG. 8 is a sequence diagram illustrating a seventh example of the communication procedure in the vehicle control system.

FIG. 8 is a seventh example of the SOME/IP communication. The SOME/IP communication illustrated in FIG. 8 is started by being triggered by one ECU 7 of the second control device group 4 transmitting an OfferService message indicating that the ECU 7 can provide a specific service through multicast transmission, and the ECU 7 receives a Request message from one ECU 6 of the first control device group 3 that requires the above-described specific service and provides the service to the ECU 6 using a Response message.

In FIG. 8, first, one ECU 7 of the second control device group 4 transmits an OfferService message indicating that the ECU 7 can provide a specific service through multicast within the second communication network 10 (S400). Hereinafter, the above-described specific service will be referred to as a service to be provided, and the ECU 7 that has transmitted the above-described OfferService message will be referred to as the server ECU 7.

The second authentication unit 32 of the second processing device 27 that has received the OfferService message from the server ECU 7 executes second authentication processing for the server ECU 7 (S402). The second authentication unit 32 finishes the processing illustrated in FIG. 8 when validity of the server ECU 7 cannot be authenticated in the second authentication processing (not illustrated).

Subsequently, the second communication control unit 33 of the second processing device 27 transfers the OfferService message from the server ECU 7 to the first processing device 26 (S404).

The first processing device 26 receives the above-described OfferService message, and the first communication control unit 31 of the first processing device 26 recognizes from the service information 24 that the server ECU 7 is a device that provides the service regarding the service to be provided in response to reception of a Request message (S406).

Then, the first communication control unit 31 generates an OfferService message in which the communication address of the server ECU 7 is set as the Endpoint address in response to the above-described recognition regarding provision of the service by the server ECU 7 on behalf of the server ECU 7 that has transmitted the OfferService message in step S400 (S408) and transmits the generated OfferService message to the respective ECUs 6 within the first communication network 9 through multicast transmission (S410).

The OfferService message transmitted through multicast transmission in step S410 is received by the respective ECUs 6. One ECU 6 (hereinafter, referred to as the client ECU 6) that requires the service to be provided indicated by the service ID of the OfferService message among the ECUs 6 within the first communication network 9 acquires the communication address of the server ECU 7 that is a communication partner from the Endpoint address of the OfferService message (S412).

The client ECU 6 transmits a Request message to the server ECU 7 using the acquired communication address of the server ECU 7 (S414). This Request message is received by the server ECU 6 via the routing device 8 without interposition of the first processing device 26 and the second processing device 27 of the communication management device 5.

The server ECU 7 that has received the above-described Request message acquires the communication address of the client ECU 6 that is a communication partner from the transmission source address of the IP packet of the received Request message (S416). The server ECU 7 transmits a Response message to the client ECU 6 via the routing device 8 using the acquired communication address of the client ECU 6 without interposition of the first processing device 26 and the second processing device 27 of the communication management device 5 (S418).

Thereafter, the client ECU 6 and the server ECU 7 repeat exchange of a Request message and a Response message directly via the routing device 8 by respectively using the communication addresses of each other acquired in step S412 and step S416 in accordance with the related art without interposition of the communication management device 5 (S420, S422).

In the example illustrated in FIG. 8, the server ECU 7 and the OfferService message transmitted in step S400 and received by the first processing device 26 respectively correspond to "one control device" and a "message received from the one control device" in the present disclosure. Further, the OfferService message transmitted in step S410 corresponds to a "relay message for relaying the message to the control device of the other of the control device groups on the basis of the message received from the one control device" in the present disclosure.

Further, in FIG. 8, step S402 corresponds to an authentication processing step in the present disclosure, step S408 and step s410 correspond to a relay transmission step, and step S414, step S418, step S420, and step S422 correspond to a first direct communication step.

[3.2.8 Eighth Example of Communication Procedure]

Figure 9:
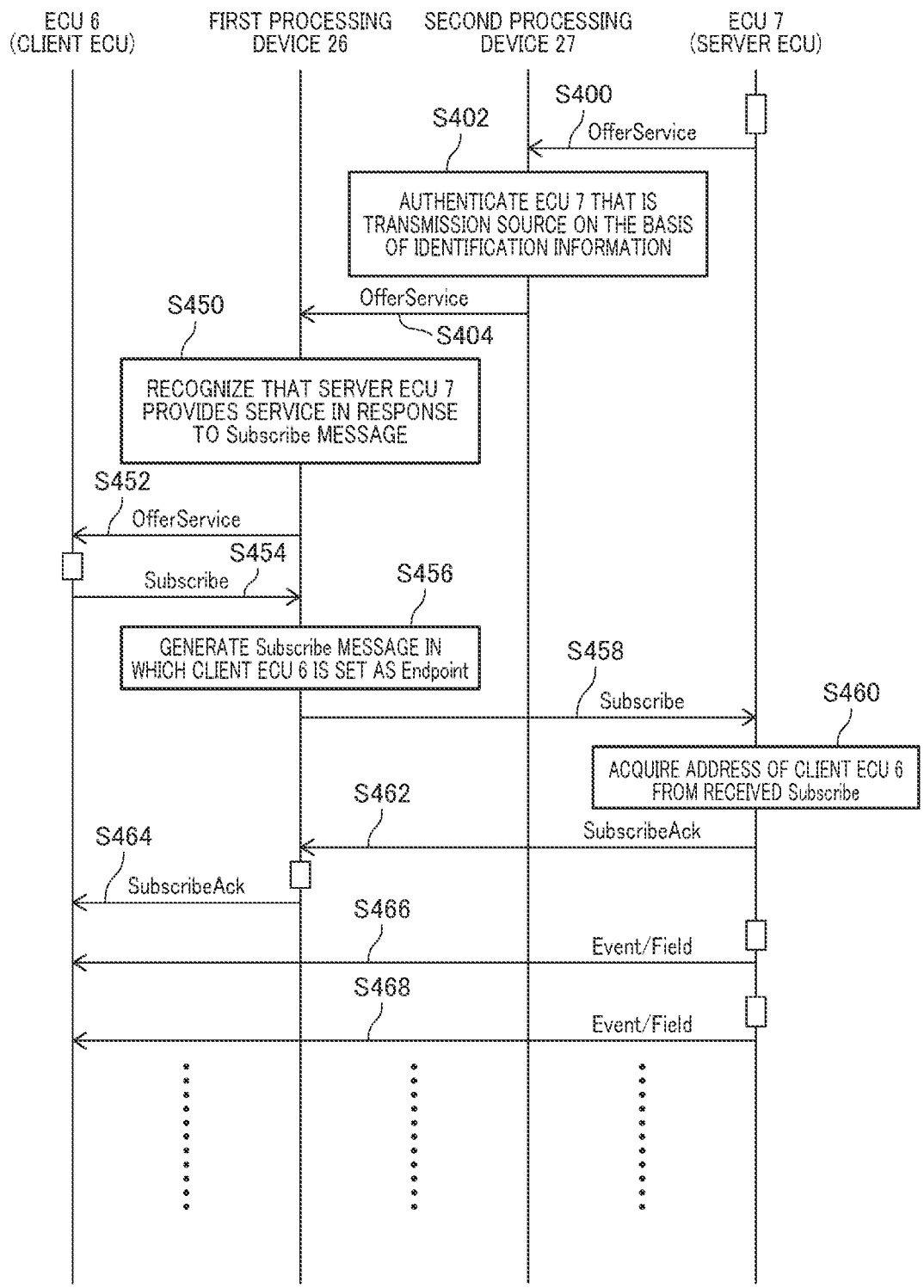
FIG. 9 is a sequence diagram illustrating an eighth example of the communication procedure in the vehicle control system.

FIG. 9 is an eighth example of the SOME/IP communication. The SOME/IP communication illustrated in FIG. 9 is started by being triggered by one ECU 7 of the second control device group 4 transmitting an OfferService message indicating that the ECU 7 can provide a specific service through multicast transmission, and the ECU 7 provides the service to one ECU 6 of the first control device group 3 that requires the above-described specific service using an Event message and/or a FieldNotification message.

Note that in FIG. 9, processing step that is the same as the processing step illustrated in FIG. 8 will be indicated with the same reference numerals as the reference numerals illustrated in FIG. 8, and description regarding FIG. 8 described above will be employed.

In the example illustrated in FIG. 9, the first communication control unit 31 of the first processing device 26 that has received the OfferService message transferred by the second communication control unit 33 of the second processing device 27 in step S404 recognizes from the service information 24 that the server ECU 7 is a device that provides the service regarding the service to be provided in response to reception of a SubscribeEventGroup message (S450).

Then, the first communication control unit 31 transmits an OfferService message in which the communication address of the first processing device 26 is set as the Endpoint address to the respective ECUs 6 within the first communication network 9 through multicast transmission in response to the above-described recognition regarding provision of the service by the server ECU 7 in accordance with the related art (S452).

The OfferService message transmitted through multicast transmission in step S452 is received by the respective ECUs 6. One ECU 6 (hereinafter, referred to as the client ECU 6) that requires the service to be provided indicated by the service ID of the OfferService message among the ECUs 6 within the first communication network 9 transmits a SubscribeEventGroup message in which the communication address of the client ECU 6 itself is set as the Endpoint address to the first processing device 26 that is the transmission source of the above-described OfferService message in accordance with the related art (S454).

The first communication control unit 31 of the first processing device 26 generates a SubscribeEventGroup message in which the communication address of the client ECU 6 is set as the Endpoint address in response to reception of the SubscribeEventGroup message transmitted in step S454 on behalf of the client ECU 6 that is the transmission source of the SubscribeEventGroup message (S456) and transmits the generated SubscribeEventGroup message to the server ECU 7 that is the transmission source of the OfferService message in step S400 (S458).

The server ECU 7 receives the above-described SubscribeEventGroup message and acquires the communication address of the client ECU 6 that becomes the communication partner to which the service is to be provided from the Endpoint address of the received SubscribeEventGroup message (S460). The server ECU 6 transmits a SubscribeEventGroupAck message that is an acknowledgement in response to the SubscribeEventGroup message transmitted in step S458 to the first processing device 26 (S462).

The first communication control unit 31 of the first processing device 26 transmits a SubscribeEventGroupAck message in which the communication address of the first processing device 26 itself is set as the Endpoint address to the client ECU 6 in response to reception of the above-described SubscribeEventGroupAck message in accordance with the related art (S464). This SubscribeEventGroupAck message is a response message in response to the SubscribeEventGroup message transmitted by the client ECU 6 in step S454.

Thereafter, the server ECU 7 can directly transmit a message to the client ECU 6 via the routing device 8 by using the communication address of the client ECU 6 acquired in step S460 without interposition of the first processing device 26 and the second processing device 27 of the communication management device 5. Thus, thereafter, the server ECU 7 continuously transmits data regarding the service to be provided to the client ECU 6 at predetermined timings using an Event message and/or a FieldNotification message without interposition of the communication management device 5, and the client ECU 6 receives these messages (S466, S468).

In the example illustrated in FIG. 9, the client ECU 6, the SubscribeEventGroup message transmitted in step S454, and the SubscribeEventGroup message transmitted in step S458 respectively correspond to "one control device", a "message received from the one control device", and a "relay message for relaying the message to the control device of the other of the control device groups on the basis of the message received from the one control device" in the present disclosure.

Further, in FIG. 9, step S456 and step S458 correspond to a relay transmission step in the present disclosure, and step S466 and step S468 correspond to a first direct communication step.

In the vehicle control system 1 having the above-described configuration, the first authentication processing for the ECU 6 and the second authentication processing for the ECU 7 are respectively executed in the first authentication unit 30 and the second authentication unit 32. By this means, in the vehicle control system 1, for example, even in a case where an attacker replaces one ECU 6 or ECU 7 with an illegal control device, it is possible to instantaneously detect this and prevent illegal communication relating to control from being performed.

Further, in addition to the above, in the vehicle control system 1, after the first authentication processing or the second authentication processing is performed, control devices that become communication partners of each other are notified of one or both of communication addresses of the ECU 6 or the ECU 7 that is one control device and the ECU 7 or the ECU 6 that is the other control device with which the one control device should perform communication through a message transmitted by the communication management device 5. Thus, after the first authentication processing or the second authentication processing is performed, the ECU 6 or the ECU 7 that is one control device and the ECU 7 or the ECU 6 that is the other control device can directly perform communication via the routing device 8 without interposition of the communication management device 5. As a result, in the vehicle control system 1, it is possible to maintain high responsiveness of vehicle control while appropriately protecting the vehicle control system 1 from illegal communication from attackers.

4. Other Embodiments

While in the above-described embodiment, the IP addresses in the SourceAddress field and the DestinationAddress field of the IP header are used as the communication addresses of the transmission source and the transmission destination of the IP packet, in addition to this, port numbers in the SourcePort field and the DestinationPort field of the UDP header may be used. Further, while in the above-described embodiment, the IP address in the IPV4 Address field (or the IPV6 Address field) of the SOME/IP-SD header is used as the Endpoint address of the SOME-IP communication message, in addition to this, a port number in the PortNumber field of the SOME/IP-SD header may be used.

Note that the present invention is not limited to the configuration of the above-described embodiment and can be carried out in various aspects within the scope not deviating from the gist.

5. Configurations to be Supported by the Above-Described Embodiment

The above-described embodiment supports the following configurations.

(Configuration 1)

A vehicle control system including two control device groups respectively constituting two different communication networks mounted on a vehicle, a communication management device communicably connected to each of control devices of the two control device groups, and a routing device that routes communication between the two communication networks, wherein when a message is received from one of the control devices, the communication management device performs authentication processing for the one of the control devices, and when validity of the one of the control devices can be authenticated, transmits a relay message for relaying a message received from one control device that is a control device of one of the control device groups to a control device of the other of the control device groups, the relay message including a communication address of the one control device as a transmission source address, and wherein the control device of the other of the control device groups starts communication with the one control device via the routing device by using the communication address of the one control device included in the relay message without interposition of the communication management device.

According to the vehicle control system of configuration 1, it is possible to instantaneously detect illegal communication from attackers on the vehicle control system through authentication processing and protect the vehicle control system and after the authentication processing, enable direct communication between two control devices belonging to different communication networks without interposition of the communication management device by a notification of a transmission source address using a relay message, so that it is possible to maintain high responsiveness of vehicle control.

(Configuration 2)

The vehicle control system according to configuration 1, in which when validity of the one of the control devices can be authenticated, the communication management device determines a communication address of the other control device with which the one control device should perform communication on the basis of device information regarding the respective control devices of the two control device groups, the other control device being the control device of the other of the control device groups, and the one control device being the control device of one of the control device groups that has transmitted the message, and transmits a return message including the determined communication address of the other control device as a transmission source address to the one control device, and the one control device starts communication with the other control device via the routing device by using the communication address of the other control device included in the return message without interposition of the communication management device.

According to the vehicle control system of configuration 2, illegal communication from attackers on the vehicle control system is detected instantaneously through authentication processing, and the vehicle control system is protected, and after the authentication processing, one control device is notified of a communication address of a communication partner of the one control device using a return message, which enables direct communication between two control devices belonging to different communication networks without interposition of the communication management device, so that it is possible to maintain high responsiveness of vehicle control.

(Configuration 3)

The vehicle control system according to configuration 1 or 2, in which one of the two control device groups includes a control device that performs control regarding motion control of the vehicle and does not include a control device that performs communication with outside of the vehicle, and the other of the two control device groups includes a control device that performs communication with outside of the vehicle and does not include a control device that performs control regarding motion control of the vehicle.

According to the vehicle control system of configuration 3, the control device group that performs communication with outside of the vehicle, which is susceptible to attacks from outside of the vehicle is connected to a communication network different from a communication network to which the control device group regarding motion control of the vehicle belongs, and the communication management device connected to these two communication networks authenticates validity of a control device that tries to start communication. By this means, in the vehicle control system of configuration 3, it is possible to appropriately protect motion control of the vehicle from attacks from outside and further improve safety of vehicle control.

(Configuration 4)

The vehicle control system according to any one of configurations 1 to 3, in which the communication management device includes two processing devices that perform processing independently from each other, and the two processing devices are respectively connected to different communication networks between the two communication networks.

According to the vehicle control system of configuration 4, the two independent processing devices respectively connected to the two communication networks cooperate to perform authentication operation in the communication management device and generate a relay message or a return message. Thus, in the vehicle control system of configuration 4, it is possible to make it difficult for operation of the communication management device to be disguised by attacks from attackers and further improve safety of vehicle control.

(Configuration 5)

The vehicle control system according to configuration 4, in which the two processing devices are respectively physical machine and virtual machine to be implemented in a processor provided in the communication management device.

According to the vehicle control system of configuration 5, two processing devices that perform processing independently from each other are implemented in one processor provided in the communication management device, so that it is possible to improve safety of vehicle control without making a hardware configuration of the communication management device complicated.

(Configuration 6)

The vehicle control system according to any one of configurations 1 to 5, in which communication to be performed by the control devices of the two control device groups and the communication management device is Service Oriented Middle warE over IP (SOME/IP) communication including transmission of a search notification and/or transmission of a provision notification, the search notification being a notification indicating that one of services, which are predetermined functional units, is searched for, the provision notification being a notification indicating that the service that is searched for can be provided.

According to the vehicle control system of configuration 6, it is possible to instantaneously detect illegal communication from attackers and protect the vehicle control system and maintain high responsiveness of vehicle control in SOME/IP communication that can efficiently achieve complicated coordinated operation of a plurality of control devices.

(Configuration 7)

A communication processing method to be executed by a vehicle control system including two control device groups respectively constituting two different communication networks mounted on a vehicle, a communication management device communicably connected to each of control devices of the two control device groups, and a routing device that routes communication between the two communication networks, the communication processing method including an authentication processing step of, when a message is received from one of the control devices, the communication management device performing authentication processing for the one of the control devices, a relay transmission step of, when validity of the one of the control devices can be authenticated, the communication management device transmitting a relay message for relaying a message received from one control device that is a control device of one of the control device groups to a control device of the other of the control device groups, the relay message including a communication address of the one control device as a transmission source address, and a first direct communication step of the control device of the other of the control device groups performing communication with the one control device via the routing device by using the communication address of the one control device included in the relay message without interposition of the communication management device.

According to the communication processing method of configuration 7, it is possible to instantaneously detect illegal communication from attackers on the vehicle control system through authentication processing and protect the vehicle control system, and after the authentication processing, enable direct communication between two control devices belonging to different communication networks without interposition of the communication management device by a notification of the transmission source address using the relay message, so that it is possible to maintain high responsiveness of vehicle control.

(Configuration 8)

The communication processing method according to configuration 7, further including a determination step of, when validity of the one of the control devices can be authenticated, the communication management device determining a communication address of the other control device with which the one control device should perform communication on the basis of device information of the respective control devices of the two control device groups, the other control device being the control device of the other of the control device groups, the one control device being the control device of one of the control device groups that has transmitted the message, a return transmission step of the communication management device transmitting a return message to the one control device, the return message including the determined communication address of the other control device as a transmission source address, and a second direct communication step of the one control device performing communication with the other control device via the routing device by using the communication address of the other control device included in the return message without interposition of the communication management device.

According to the communication processing method of configuration 8, illegal communication from attackers on the vehicle control system is instantaneously detected through authentication processing, and the vehicle control system is protected, and after the authentication processing, one control device is notified of a communication address of a communication partner of the one control device using a return message, which enables direct communication between two control devices belonging to different communication networks without interposition of the communication management device, so that it is possible to maintain high responsiveness of vehicle control.

REFERENCE SIGNS LIST

1 Vehicle control system
2 Vehicle
3 First control device group
4 Second control device group
5 Communication management device
6, 7 ECU
6a Drive ECU
6b Steering ECU
6c Battery ECU
6d ADAS-ECU
7a TCU
7b IVI-ECU
7c DMC-ECU
8 Routing device
9 First communication network
10 Second communication network
20 Processor
21 Memory
22a First communication device
22b Second communication device
23 Identification information
24 Service information
25a First program
25b Second program
26 First processing device
27 Second processing device
30 First authentication unit
31 First communication control unit
32 Second authentication unit
33 Second communication control unit
40 Hub
41 Device
41a Device A
41b Device B

What is claimed is:

1. A vehicle control system comprising two control device groups respectively constituting two different communication networks mounted on a vehicle, a communication management device communicably connected to each of control devices of the two control device groups, and a routing device that routes communication between the two communication networks,
wherein when a message is received from one of the control devices, the communication management device performs authentication processing for the one of the control devices,
when validity of the one of the control devices can be authenticated, transmits a relay message for relaying a message received from one control device that is a control device of one of the control device groups to a control device of the other of the control device groups, the relay message including a communication address of the one control device as a transmission source address, and
wherein the control device of the other of the control device groups starts communication with the one control device via the routing device by using the communication address of the one control device included in the relay message without interposition of the communication management device,
the communication management device includes two processing devices that perform processing independently from each other, and
the two processing devices are respectively connected to different communication networks between the two communication networks.

2. The vehicle control system according to claim 1, wherein
when validity of the one of the control devices can be authenticated, the communication management device determines a communication address of the other control device with which the one control device should perform communication on a basis of device information regarding the respective control devices of the two control device groups, the other control device being the control device of the other of the control device groups, and the one control device being the control device of one of the control device groups that has transmitted the message,
transmits a return message including the determined communication address of the other control device as a transmission source address to the one control device, and the one control device starts communication with the other control device via the routing device by using the communication address of the other control device included in the return message without interposition of the communication management device.

3. The vehicle control system according to claim 1, wherein one of the two control device groups includes a control device that performs control regarding motion control of the vehicle and does not include a control device that performs communication with outside of the vehicle, and the other of the two control device groups includes a control device that performs communication with outside of the vehicle and does not include a control device that performs control regarding motion control of the vehicle.

4. The vehicle control system according to claim 1, wherein the two processing devices are respectively physical machine and virtual machine to be implemented in a processor provided in the communication management device.

5. The vehicle control system according to claim 1, wherein communication to be performed by the control devices of the two control device groups and the communication management device is Service Oriented MiddlewarE Over IP (SOME/IP) communication including transmission of a search notification and/or transmission of a provision notification, the search notification being a notification indicating that one of services, which are predetermined functional units, is searched for, the provision notification being a notification indicating that the service that is searched for can be provided.

6. A communication processing method to be executed by a vehicle control system including two control device groups respectively constituting two different communication networks mounted on a vehicle, a communication management device communicably connected to each of control devices of the two control device groups, and a routing device that routes communication between the two communication networks, the communication management device including two processing device that perform processing independently from each other, and the two processing devices being respectively connected to different communication networks between the two communication networks, the communication processing method comprising:

an authentication processing step of, when a message is received from one of the control devices, the communication management device performing authentication processing for the one of the control devices;

a relay transmission step of, when validity of the one of the control devices can be authenticated, the communication management device transmitting a relay message for relaying a message received from one control device that is a control device of one of the control device groups to a control device of the other of the control device groups, the relay message including a communication address of the one control device as a transmission source address; and a first direct communication step of the control device of the other of the control device groups performing communication with the one control device via the routing device by using the communication address of the one control device included in the relay message without interposition of the communication management device.

7. The communication processing method according to claim 6, further comprising:

a determination step of, when validity of the one of the control devices can be authenticated, the communication management device determining a communication address of the other control device with which the one control device should perform communication on a basis of device information of the respective control devices of the two control device groups, the other control device being the control device of the other of the control device groups, and the one control device being the control device of one of the control device groups that has transmitted the message;

a return transmission step of the communication management device transmitting a return message to the one control device, the return message including the determined communication address of the other control device as a transmission source address; and a second direct communication step of the one control device performing communication with the other control device via the routing device by using the communication address of the other control device included in the return message without interposition of the communication management device.

* * * * *